(12) United States Patent  
Takata et al.

(10) Patent No.: US 8,493,631 B2
(45) Date of Patent: Jul. 23, 2013

(54) IMAGE FORMING APPARATUS WITH PIVOTING OPERATION PANEL CONTROL METHOD THEREFOR, AND OPERATION APPARATUS OF EQUIPMENT

(75) Inventors: Shinichi Takata, Abiko (JP); Takashi Fujimori, Moriya (JP); Hiroaki Tomiyasu, Toride (JP); Yuichi Yamamoto, Abiko (JP)

(73) Assignee: Canon Kabushiki Kaisha (JP)

( * ) Notice: Subject to any disclaimer, the term of this patent is extended or adjusted under 35 U.S.C. 154(b) by 1275 days.

(21) Appl. No.: 12/140,246

(22) Filed: Jun. 16, 2008

(65) Prior Publication Data

US 2008/0316541 A1 Dec. 25, 2008

(30) Foreign Application Priority Data

Jun. 22, 2007 (JP) ................................. 2007-165476
Jun. 22, 2007 (JP) ................................. 2007-165477

(51) Int. Cl.
*H04N 1/00* (2006.01)

(52) U.S. Cl.
USPC ............................. 358/401; 345/156; 399/81

(58) Field of Classification Search
None
See application file for complete search history.

(56) References Cited

U.S. PATENT DOCUMENTS 4,724,462 A * 2/1988 Yamasaki et al. ............... 399/81
2006/0171734 A1* 8/2006 Maeda ............................ 399/81

FOREIGN PATENT DOCUMENTS

| JP | 2001-305814 A | 11/2001 |
| JP | 2003-170639 A | 6/2003 |
| JP | 2006-072236 A | 3/2006 |
| JP | 2006-251190 A | 9/2006 |
| JP | 2006-251199 A | 9/2006 |
| JP | 2006-345068 A | 12/2006 |
| JP | 2006-347090 A | 12/2006 |

* cited by examiner

*Primary Examiner* — Twyler Haskins
*Assistant Examiner* — Christopher D Wait
(74) *Attorney, Agent, or Firm* — Rossi, Kimms & McDowell LLP

(57) ABSTRACT

An image forming apparatus having improved installability and operability. The image forming apparatus has an operation unit thereof disposed on an arm extending from the apparatus and pivotable around a support member in substantially the horizontal direction, and has sensors for detecting the pivot position of the operation unit. An initial-screen setting screen determined based on the pivot position of the operation unit detected by the sensors is displayed on the operation unit.

11 Claims, 21 Drawing Sheets

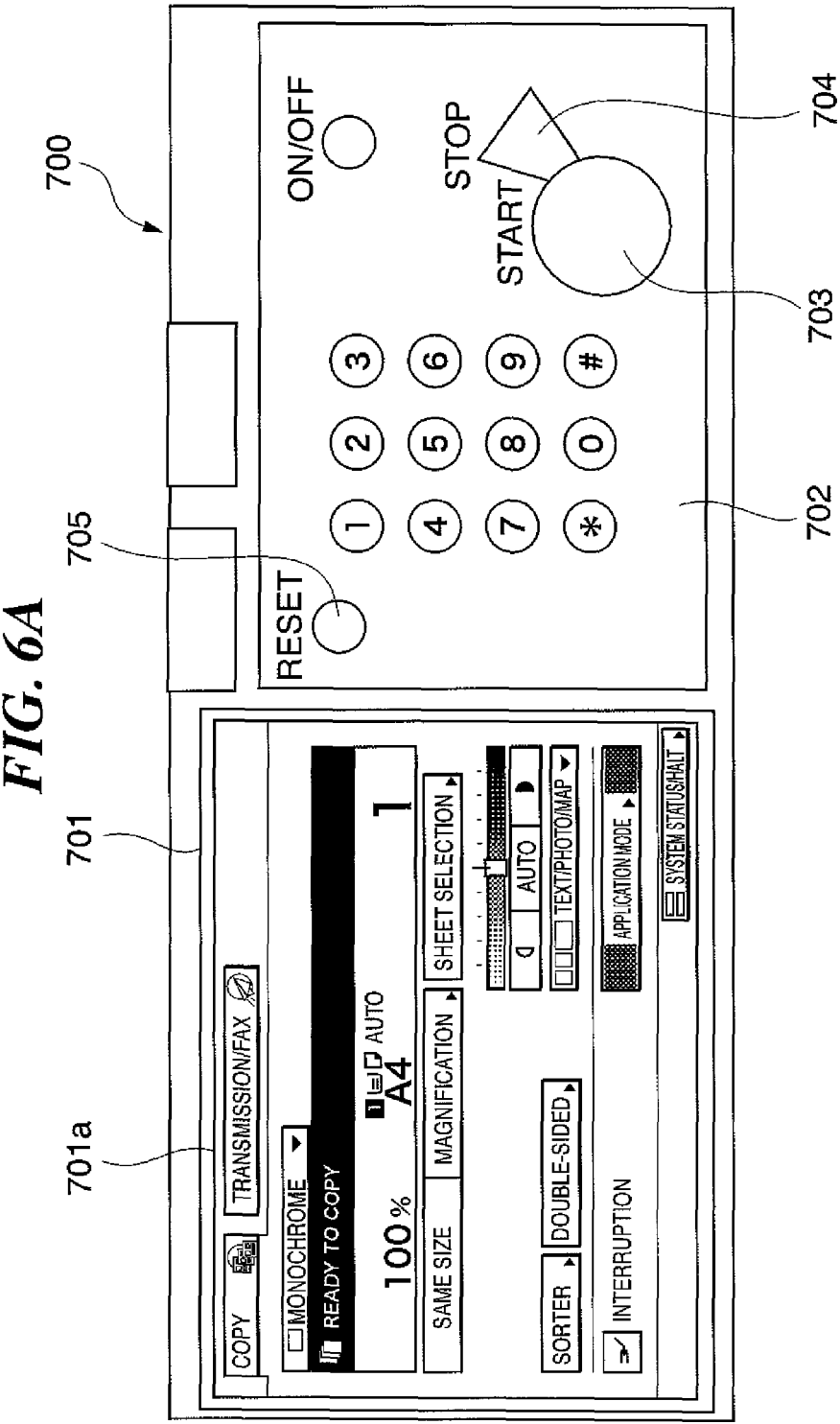

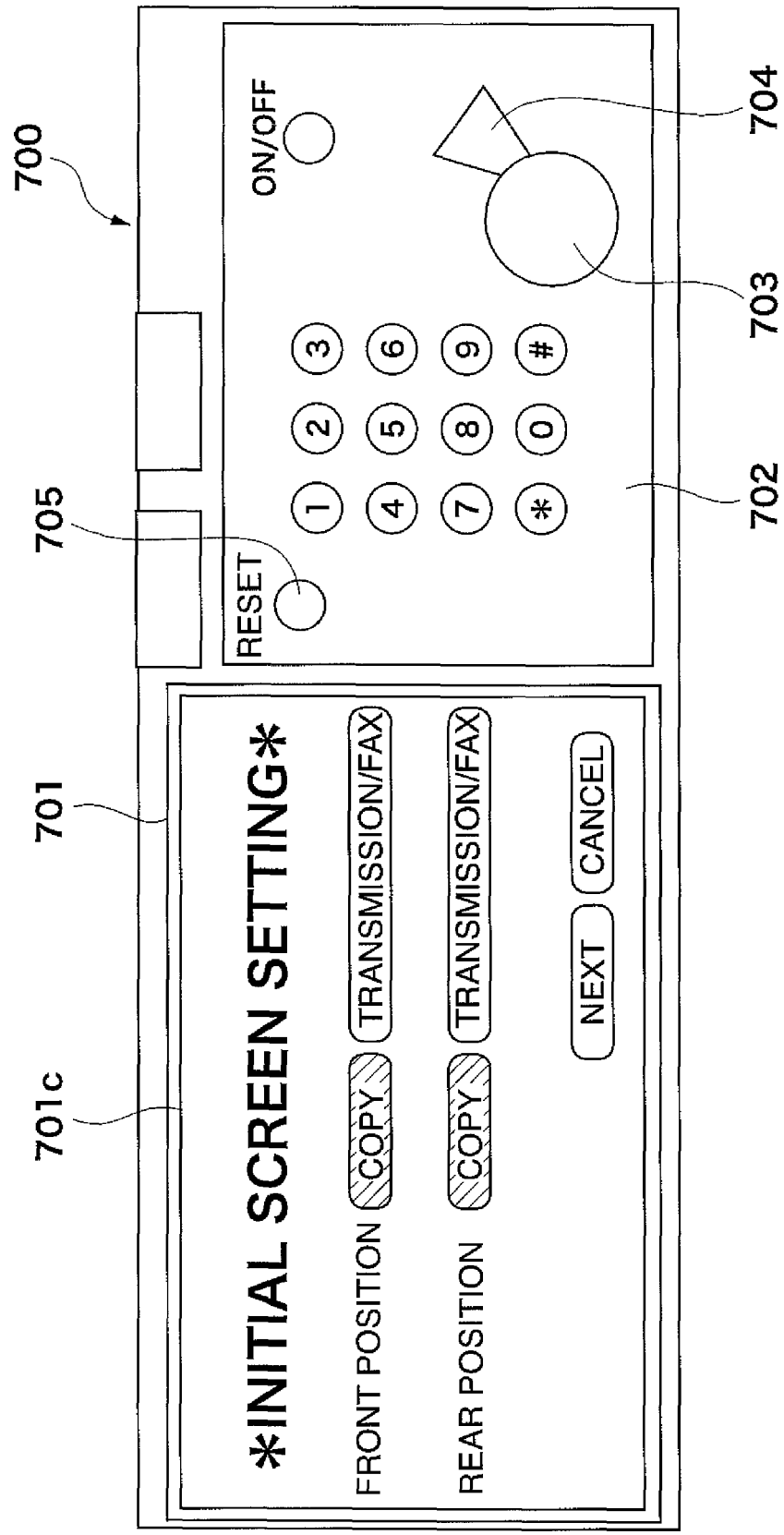

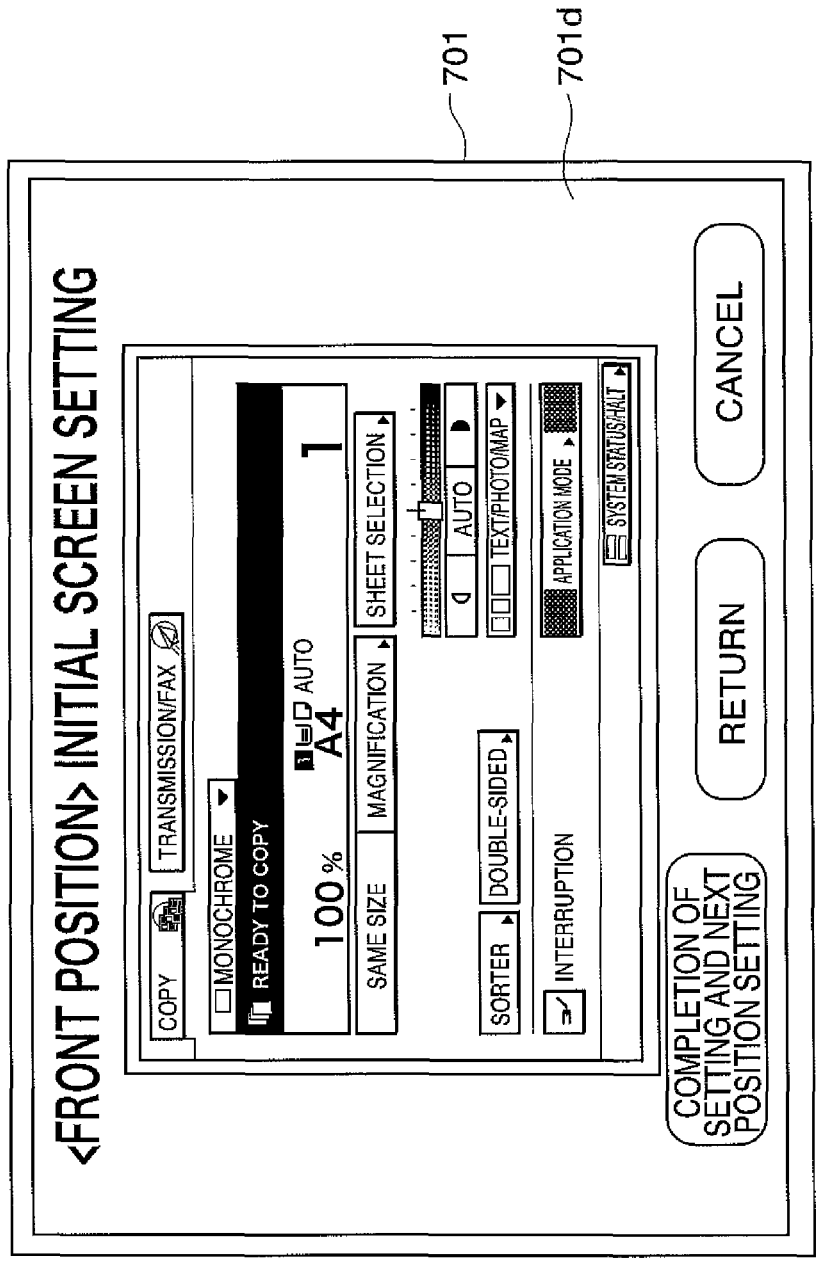

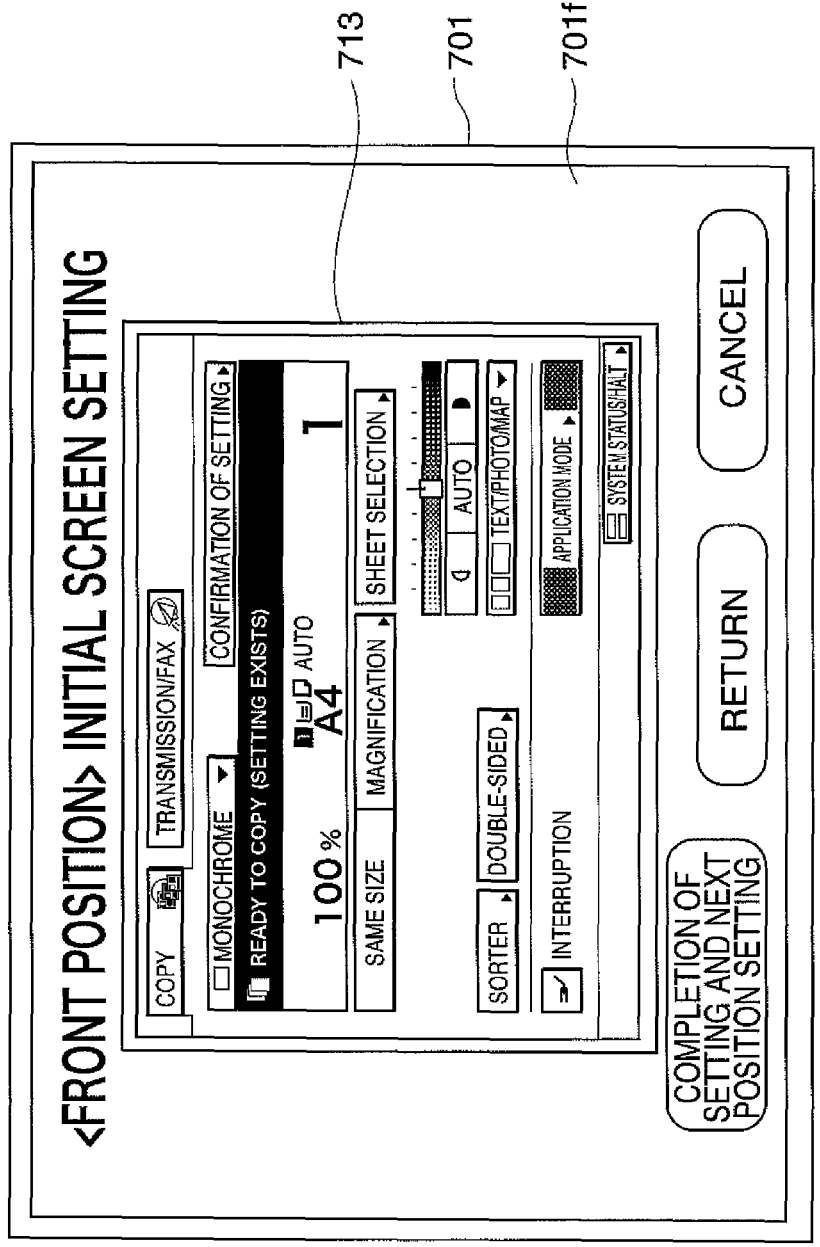

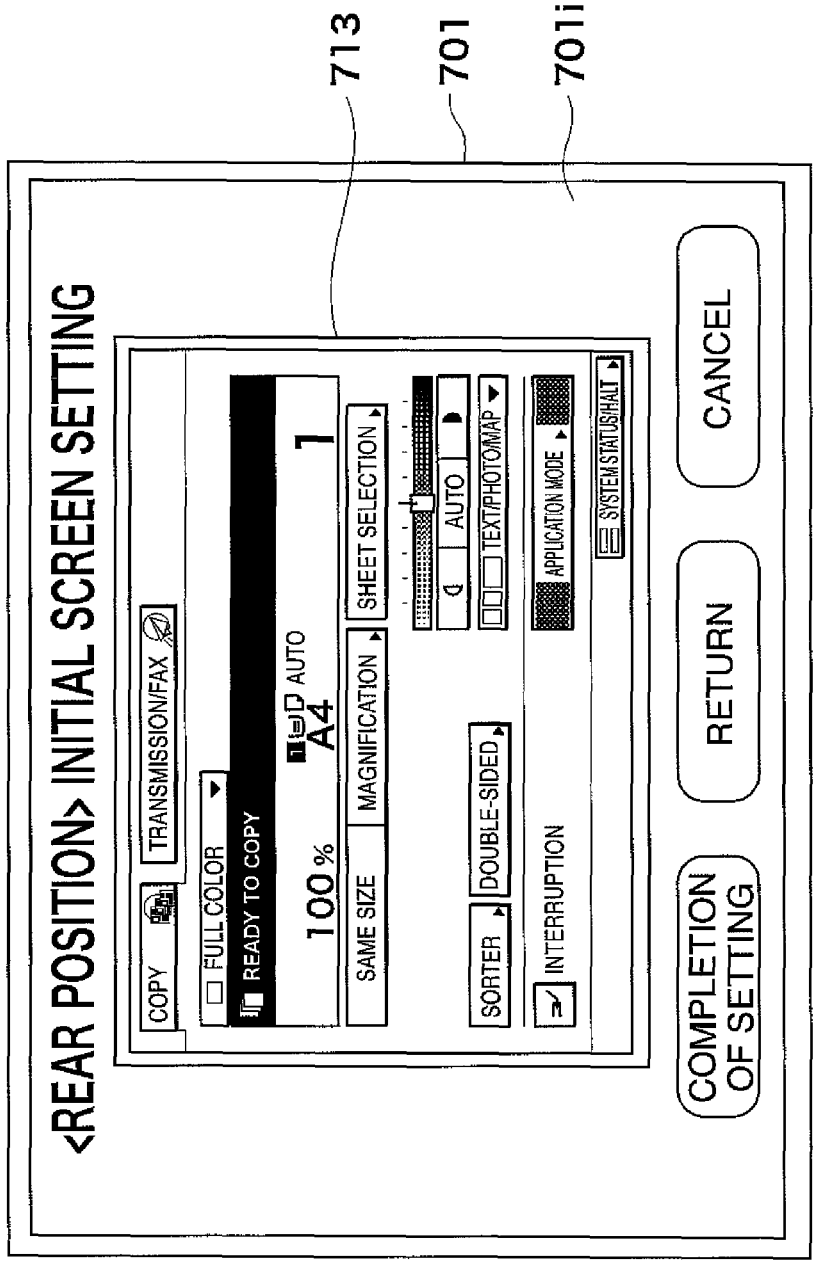

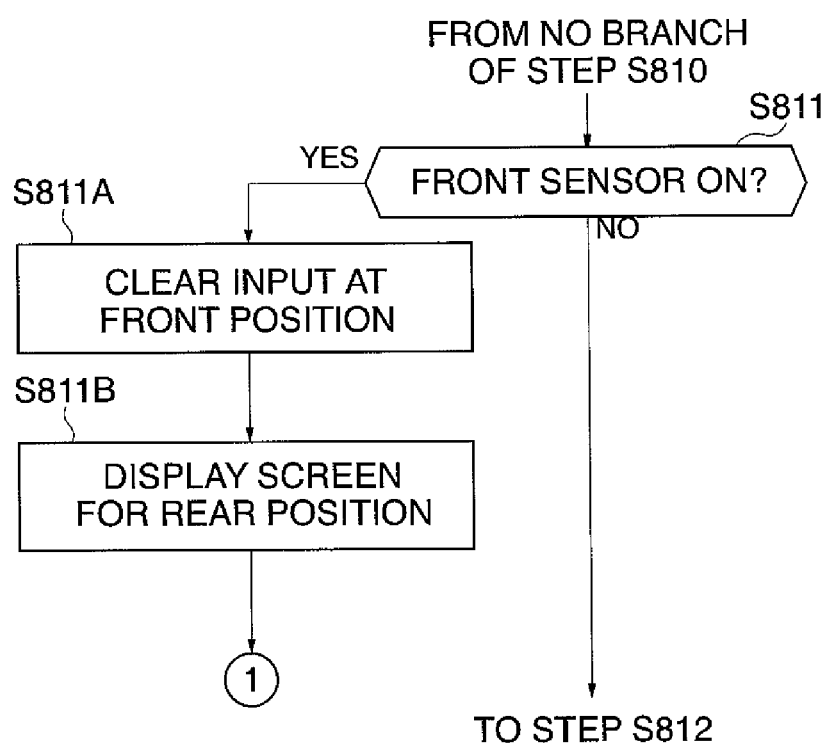

IMAGE FORMING APPARATUS WITH PIVOTING OPERATION PANEL CONTROL METHOD THEREFOR, AND OPERATION APPARATUS OF EQUIPMENT

BACKGROUND OF THE INVENTION

1. Field of the Invention

The present invention relates to an image forming apparatus such as a copying machine and a printer, a control method for image forming apparatus, and an operation apparatus of equipment. More particularly, the present invention relates to an image forming apparatus having an operation unit for input of image formation-related operation and for display of a processing status, and a control method for image forming apparatus.

2. Description of the Related Art

In recent years, office automation equipment such as a copying machine, a facsimile machine, and a printer has become more multifunctional with the advance of digital technology and network technology, and has been used in offices or the like as information terminal equipment (e.g., image forming apparatus) for handling electronic information or paper information. For the information terminal equipment installed in offices, there has been increasing demand for improving its installability (the degree of freedom of installation environment) such as the capability of the equipment being installed in a center area of office space or between desks. To cope with this, a technique of configuring an operation unit of an image forming apparatus to be pivotable for use from a plurality of directions has been proposed (see, for example, Japanese Laid-open Patent Publication No. 2001-305814).

However, by simply making the operation unit pivotable for use from a plurality of directions, it is difficult to sufficiently improve the installability of the image forming apparatus. Thus, a further improvement in the operability or in the operation of the entire apparatus is required. For example, in the image forming apparatus operable from its front and rear sides, there are the following problems.

In a case where the operation unit is operated by an operator from the front side of the apparatus and then rotated by another operator for operation from the rear side of the apparatus, the operator on the rear side sometimes erroneously gives an instruction for unintentional apparatus operation without aware that apparatus operation settings performed by the operator on the front side are left unchanged.

In addition, each operator is required to perform a cumbersome operation of changing a setting screen over to a desired function screen each time after rotating the operation unit, especially if the frequency and tendency of use of functions (such as copying and fax transmission) are different between the operators on the front and rear sides of the apparatus.

SUMMARY OF THE INVENTION

The present invention provides an image forming apparatus, a control method therefor, and an operation apparatus of equipment that are capable of improving the installability (degree of freedom of installation environment) and the operability of the image forming apparatus and the equipment.

The present invention also provides an image forming apparatus and a control method therefor that are capable of shortening a fast copy time and improving the usability thereof.

According to a first aspect of the present invention, there is provided an image forming apparatus comprising an operation panel configured to be pivotable relative to the image forming apparatus, the operation panel being configured to display information related to an image formation and configured for input of an instruction related to the image formation, a pivot position detecting unit configured to detect at least two pivot positions of the operation panel, a registration unit configured to register default setting screens to be) displayed on the operation panel for input of the instruction, the default setting screens being registered to correspond to each of the at least two pivot positions of the operation panel, and a control unit configured to cause the operation panel to display a setting screen corresponding to a pivot position of the operation panel detected by the pivot position detecting unit among the at least two setting screens registered by the registration unit.

According to a second aspect of the present invention, there is provided a control method for an image forming apparatus having an operation panel configured to be pivotable, the operation panel being configured to display information related to an image formation and configured for input of an instruction related to the image formation, comprising registering default setting screens to be displayed on the operation panel, the default setting screens being registered to correspond to each of at least two pivot positions of the operation panel, detecting a pivot position of the operation panel, causing the operation panel to display a setting screen corresponding to a detected pivot position of the operation panel among the registered setting screens.

According to a third embodiment of the present invention, there is provided an image forming apparatus comprising an image forming unit configured to perform image formation, an operation panel configured to be pivotable relative to the image forming apparatus, the operation panel being configured to display information related to image formation and configured for input of an instruction related to the image formation, and a pivotal motion detecting unit configured to detect a pivotal motion of the operation panel, wherein the image forming unit selectively carries out a preparatory operation for the image formation in response to the pivotal motion of the operation panel being detected by the pivotal motion detecting unit.

According to a fourth embodiment of the present invention, there is provided a control method for an image forming apparatus having an image forming unit configured to perform image formation and an operation panel configured to be pivotable, the operation panel being configured to display information related to an image formation and configured for input of an instruction related to the image formation, comprising detecting a pivotal motion of the operation panel, and selectively carrying out a preparatory operation for the image formation in response to the pivotal motion of the operation panel being detected.

According to a fifth embodiment of the present invention, there is provided an operation apparatus of equipment comprising an operation panel configured to be pivotable relative to the equipment, the operation panel being configured to display information related to function of equipment and configured for input of an instruction related to function of the equipment, a pivot position detecting unit configured to detect at least two pivot positions of the operation panel, a registration unit configured to manually register setting screens to be displayed on the operation panel for input of the instruction, the setting screens being registered to correspond to each of the at least two pivot positions of the operation panel, and a control unit configured to cause the operation panel to display a setting screen corresponding to a pivot position of the operation panel detected by the pivot position detecting unit among the setting screens registered by the registration unit.

According to a sixth embodiment of the present invention, there is provided an operation apparatus of equipment comprising an operation panel configured to be pivotable relative to the equipment, the operation panel being configured to display information related to function of the equipment and configured for input of an instruction related to the function of the equipment, a pivot position detecting unit configured to detect at least two pivot positions of the operation panel, a registration unit configured to register default setting screens to be displayed on the operation panel for input of the instruction, the default setting screens being registered to correspond to each of the at least two pivot positions of the operation panel, and a control unit configured to cause the operation panel to display a default setting screen registered corresponding to a pivot position of the operation panel detected by the pivot position detecting unit.

According to the present invention, a pivotable operation panel for image formation-related display and for input of an image formation-related instruction is provided, and setting screens for being displayed on the operation panel are set beforehand such as to correspond to respective ones of two pivot positions of the operation panel. Then, a pivot position of the operation panel is detected, and a setting screen corresponding to the detected pivot position is displayed on the operation panel. As a result, the installability (the degree of freedom of installation environment) and the operability of an image forming apparatus and equipment can be improved.

According to the present invention, a pivotable operation panel for image formation-related display and for input of an image formation-related instruction is provided. When a pivotal motion of the operation panel is detected, a preparatory operation for image formation is selectively carried out. By performing the preparatory operation for image formation in conjunction with the pivotal motion of the operation panel, a fast copy time can be shortened and usability can be improved.

Further features of the present invention will become apparent from the following description of exemplary embodiments with reference to the attached drawings.

BRIEF DESCRIPTION OF THE DRAWINGS

FIG. 6A is a view showing a liquid crystal display section with touch panel of the operation unit in a state that a copy screen is displayed thereon;

FIG. 7 is a view showing the display section in a state that an initial-screen setting screen is displayed thereon;

FIGS. 8A to 8C are views showing an example of the way of setting an initial screen to be displayed on the display section of the operation unit when the unit is pivoted to a position facing a front side of the image forming apparatus, wherein FIG. 8A shows an initial-screen setting screen for front position displayed on the display section, FIG. 5B shows a double-sided setting selection screen displayed on the display section, and FIG. 5C shows the initial-screen setting screen displayed again on the display section;

FIGS. 9A to 9C are views showing an example of the way of setting an initial screen to be displayed on the display section of the operation unit when the unit is pivoted to a position facing a rear side of the image forming apparatus, wherein FIG. 9A shows an initial-screen setting screen for rear position displayed on the display section, FIG. 9B shows a color mode setting screen displayed on the display section, and FIG. 9C shows the initial-screen setting screen displayed again on the display section;

FIG. 16 is a flowchart showing a part of a control process according to a modification of the first embodiment.

DETAILED DESCRIPTION OF THE PREFERRED EMBODIMENTS

The present invention will now be described in detail below with reference to the drawings showing preferred embodiments thereof.

First Embodiment

Figure 1:
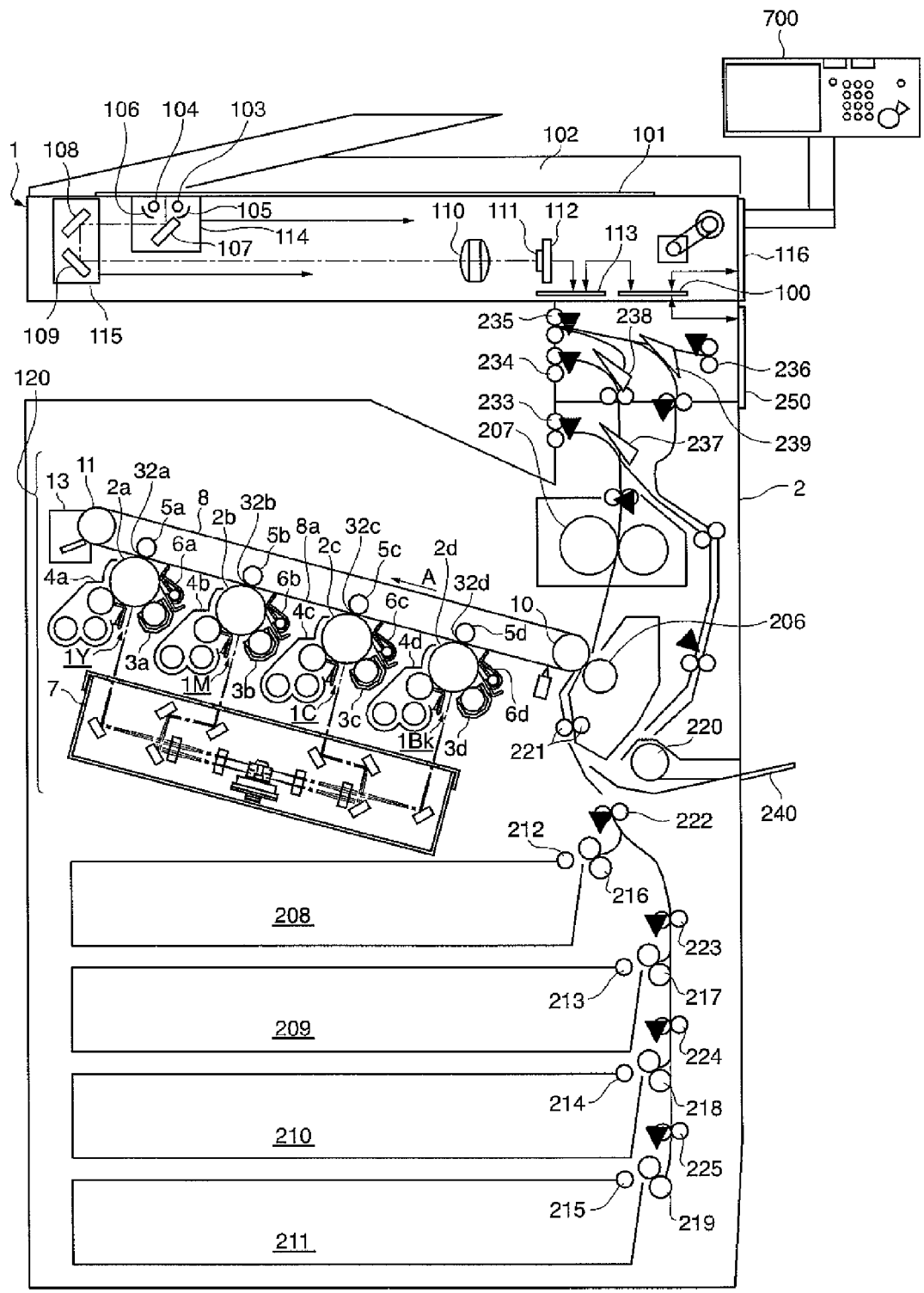
FIG. 1 is a vertical section view schematically showing an image forming apparatus according to a first embodiment of this invention.

FIG. 1 is a vertical section view schematically showing the construction of an image forming apparatus according to a first embodiment of this invention. The image forming apparatus is a color image forming apparatus and comprised of a color reader unit 1 and a color printer unit 2.

First, the construction of the color reader unit 1 is described.

The color reader unit 1 includes an original tray glass (platen) 101 and an automatic document feeder (ADF) 102. Instead of the automatic document feeder 102, a mirror platen or a white platen (not shown) may be mounted.

The color reader unit 1 includes light sources 103, 104 for illuminating an original placed on the original tray glass 101. The light sources 103, 104 are each implemented by, for example, a halogen lamp, a fluorescent lamp, or a xenon tube lamp. Light from the light sources 103, 104 is converged by reflectors 105, 106 provided in the reader unit.

The color reader unit 1 includes mirrors 107 to 109 for guiding light reflected or projected from an original toward a charge-coupled device image sensor (hereinafter referred to as the "CCD") 111. The light guided by the mirrors 107 to 109 is converged by a lens 110 on the CCD 111.

A carriage 114 contains the light sources 103, 104, the reflectors 105, 106, and the mirror 107. A carriage 115 contains the mirrors 108, 109. The carriages 114, 115 move at a speed V and a speed V/2, respectively, in the sub-scanning direction perpendicular to the electrically scanning direction of the CCD 111 (main scanning direction), thereby scanning the entire surface of the original placed on the original tray glass 101.

The CCD 111 is mounted on a circuit board 112. A reader control unit 113 is connected to the circuit board 112 and a control unit 100, and carries out image reading control and others. An external interface (I/F) 116 is connected to the control unit 100 and controls the connection with other devices.

The control unit 100 includes a CPU having interfaces for exchange of control information with the reader control unit 113, the external I/F 116, and a printer control unit 250, includes a RAM and a ROM for storing the control information or other information, etc., and controls the entire image forming apparatus.

An operation unit (operation panel) 700 is disposed on an L-shaped arm (supporting part) extending from a side surface of the color reader unit 1, and is configured for a 360-degree pivotal motion about the arm in substantially the horizontal direction of the image forming apparatus. By changing the orientation of the operation unit 700, the operation unit 700 becomes operable not only from the front side (corresponding to the orientation of the section view in FIG. 1) of the image forming apparatus but also from the rear side of the apparatus.

The operation unit 700 is adapted to display information related to an image formation and adapted to input an instruction related to an image formation, and includes a liquid crystal display section with touch panel and a key input section. The liquid crystal display section with touch panel is adapted to display information, warning, etc. relating to various processing such as copying, fax transmission, and printing performed by the image forming apparatus, and is adapted to accept instructions for causing the image forming apparatus to perform these processing. The key input section accepts key inputs to start and stop various processing, etc.

Next, a description is given on the construction of the color printer unit 2.

The color printer unit 2 includes a printer control unit 250 for receiving a control signal from the CPU in the control unit 100. The control unit 100 performs image reading control for the color reader unit 1, and temporarily stores image data read from an original or the like in a memory in the unit 100. Then, in accordance with reference timing from the printer control unit 250, image data stored in the memory is transmitted as an image data signal to the printer control unit 250 in synchronism with a video clock signal.

A toner image forming unit 120 includes a toner image forming unit 1Y for forming an yellow colored image, a toner image forming unit 1M for forming a magenta colored image, a toner image forming unit 1C for forming a cyan colored image, and a toner image forming unit 1Bk for forming a black colored image. These four toner image forming units 1Y, 1M, 1C, 1Bk are disposed on a line with a predetermined distance therebetween.

The toner image forming units 1Y, 1M, 1C, 1Bk respectively include drum-type electrophotographic photosensitive members (hereinafter referred to as the "photosensitive drums") 2a to 2d serving as image carriers. Around the photosensitive drums 2a to 2d, there are disposed primary charging devices 3a to 3d, developing devices 4a to 4d, transfer rollers 5a to 5d, and drum cleaners 6a to 6d.

Each of the photosensitive drums 2a to 2d is a negatively chargeable OPC photosensitive member having an aluminum drum member thereof formed with a photoconductive layer thereon. Each photosensitive drum is rotatably driven by a driving unit (not shown) at a predetermined process speed in a direction of arrow (anticlockwise direction in FIG. 1).

The primary charging devices 3a to 3d function as primary charging means, and uniformly charge surfaces of the photosensitive drums 2a to 2d at a predetermined negative potential with charging bias applied from a charging bias power source (not shown).

The developing devices 4a to 4d cause color toners to be adhered to electrostatic latent images formed on the photosensitive drums 2a to 2d, to thereby develop (visualize) the electrostatic latent images into toner images. The developing devices 4a to 4b respectively contain yellow toner, cyan toner, magenta toner, and black toner.

The transfer rollers 5a to 5d function as primary transfer means, and are disposed in contact at primary transfer parts 32a to 32d with the photosensitive drums 2a to 2d via the intermediate transfer belt B.

The drum cleaners 6a to 6d have cleaning blades for removing residual toner remaining on the photosensitive drums 2a to 2d after the transfer.

The endless intermediate transfer belt 8 is comprised of dielectric resin such as poly carbonate, poly ethylene terephthalate resin film, and poly vinylidene diffluoride resin film. The intermediate transfer belt 8 is stretched between the secondary transfer opposed roller 10 for applying a driving force to the intermediate transfer belt 8 and a tension roller 11 for applying a tension force to the intermediate transfer belt 8. A secondary transfer roller 206 is disposed at a location facing the secondary transfer opposed roller 10, with the intermediate transfer belt 8 held therebetween.

The intermediate transfer belt 8 is configured to be movable relative to the primary transfer parts 32a to 32d disposed between the photosensitive drums 2a to 2d and the transfer rollers 5a to 5d disposed at locations facing the photosensitive drums 2a to 2d. The intermediate transfer belt 8, the tension roller 11, the secondary transfer opposed roller 10, the photosensitive drums 2a to 2d, the transfer rollers 5a to 5d, and the secondary transfer roller 206 are disposed to be inclined as a whole such that the secondary transfer roller 206 side is at a lower height than the tension roller 11 side. The angle of inclination is set at about 15 degrees.

Near the tension roller 11, there is disposed a belt cleaner 13 for removing and collecting residual toner remaining on the surface of the intermediate transfer belt 8. A recording sheet is conveyed between the secondary transfer opposed roller 10 and the secondary transfer roller 206. On the downstream side in the direction in which the recording sheet is conveyed, a fixing unit 207 including a fixing roller and a pressurizing roller is disposed.

A laser exposure unit 7 is disposed below the developing devices 4a to 4d. The laser exposure unit 7 includes a laser emitting device for emitting light in accordance with a time-series of electric digital image signals of given image information, a polygon lens, a polygon mirror (polyangular mirror), and a polygon motor for rotatably driving the polygon mirror. When the laser exposure unit 7 exposes the photosensitive drums 2a to 2d to light, electrostatic latent images in respective colors are formed in accordance with the image information on the surfaces of the photosensitive drums 2a to 2d charged by the primary charging devices 3a to 3d. The laser emitting device in the laser exposure unit 7 is capable of adjusting laser power in 15 stages by changing laser output current.

Next, an image forming operation in the image forming apparatus shown in FIG. 1 is described.

When an image forming start signal is supplied, the photosensitive drums 2a to 2d are rotatably driven at a predetermined process speed and uniformly charged in negative polarity by the primary charging devices 3a to 3d.

Next, the laser exposure unit 7 irradiates laser light onto the photosensitive drums 2a to 2d via the polygon lens, the polygon mirror, etc. in accordance with given image information, whereby electrostatic latent images in respective colors are formed on the photosensitive drums 2a to 2d.

Yellow toner is caused to be adhered to the electrostatic image formed on the photosensitive drum 2a by means of the developing device 4a applied with a developing bias which is the same in polarity as the polarity of electrification (negative) of the photosensitive drum 2a, whereby the electrostatic latent image is visualized. The yellow toner image is transferred onto the intermediate transfer belt 8 at the primary transfer part 32a between the photosensitive drum 2a and the transfer roller 5a by means of the transfer roller 5a applied with primary transfer bias (which is opposite (positive) in polarity to the toner).

When a part of the intermediate transfer belt 8 to which the yellow toner image has been transferred moves from the toner image forming unit 1Y to the toner image forming unit 1M, a magenta toner image formed on the photosensitive drum 2b in the toner image forming unit 1M is transferred to the intermediate transfer belt 8 at the primary transfer part 32b in such a manner that the magenta toner image is superimposed on the yellow toner image. At this time, residual toner remaining on the photosensitive drums 2a, 2b is scraped off for recovery by means of cleaner blades or the like provided on the drum cleaners 6a, 6b.

Similarly, cyan and black toner images formed on the photosensitive drums 2c, 2d of the toner image forming units 1C, 1Bk are sequentially superposed on the yellow and magenta toner images formed in layer on the intermediate transfer belt 8 at the primary transfer parts 32c, 32d. As a result, a full color toner image is formed on the intermediate transfer belt 8.

An upper cassette 208, a lower cassette 209, a third cassette 210, and a fourth cassette 211 can hold recording sheets. Recording sheets held in each cassette are picked up by a pickup roller 212, 213, 214 or 215 and transferred by a sheet feeding roller 216, 217, 218 or 219 along a conveyance path. The transferred recording sheet is conveyed by a longitudinal path conveyance roller 222, 223, 224 or 225 up to a registration roller 221. On the other hand, in the case of manual sheet feeding, recording sheets stacked on a manual feed tray 240 are conveyed by a manual sheet-feeding roller 220 up to the registration roller 221.

The recording sheet conveyed to the registration roller 221 is transferred to between the intermediate transfer belt 8 and the secondary transfer roller 206 in timing in which the primary transfer to the intermediate transfer belt 8 is completed. The recording sheet is then conveyed toward the fixing unit while being held between the roller 206 and the belt 8 and is pressed against the belt 8, whereby a toner image on the intermediate transfer belt 8 is transferred to the recording sheet. The toner image transferred to the recording sheet is heated and pressurized by the fixing roller and the pressurizing roller in the fixing unit 207, whereby the toner image is fixed on the recording sheet.

In a first sheet discharging mode, a first sheet discharge flapper 237 is changed over toward a first sheet discharge roller, and the recording sheet on which an image has been fixed is discharged toward a sheet discharge roller 233. In a second sheet discharging mode, the first and second sheet discharge flappers 237, 238 are changed over toward a second sheet discharge roller, and the recording sheet is discharged toward a sheet discharge roller 234. In a third sheet discharging mode, the first and second sheet discharge flappers are changed over toward an inversion roller 235, and the recording sheet is inverted by the inversion roller 235. Then, a third sheet discharge flapper 239 is changed over toward a third sheet discharge roller 236, and the recording sheet inverted by the inversion roller 235 is discharged toward the third sheet discharge roller 236.

As in the third sheet discharging mode, in the case of double-sided sheet discharging, the recording sheet is inverted by the inversion roller 235, the third sheet discharge flapper is changed over toward a double-sided unit, and the recording sheet is conveyed toward the double-sided unit. Upon elapse of a predetermined time period from when the recording sheet has been detected by a sensor (not shown) in the double-sided unit, the recording sheet is temporarily stopped from being conveyed. Subsequently, when the preparation for image formation is completed again, the recording sheet is conveyed and an image is formed on a second surface of the sheet.

Figure 2:
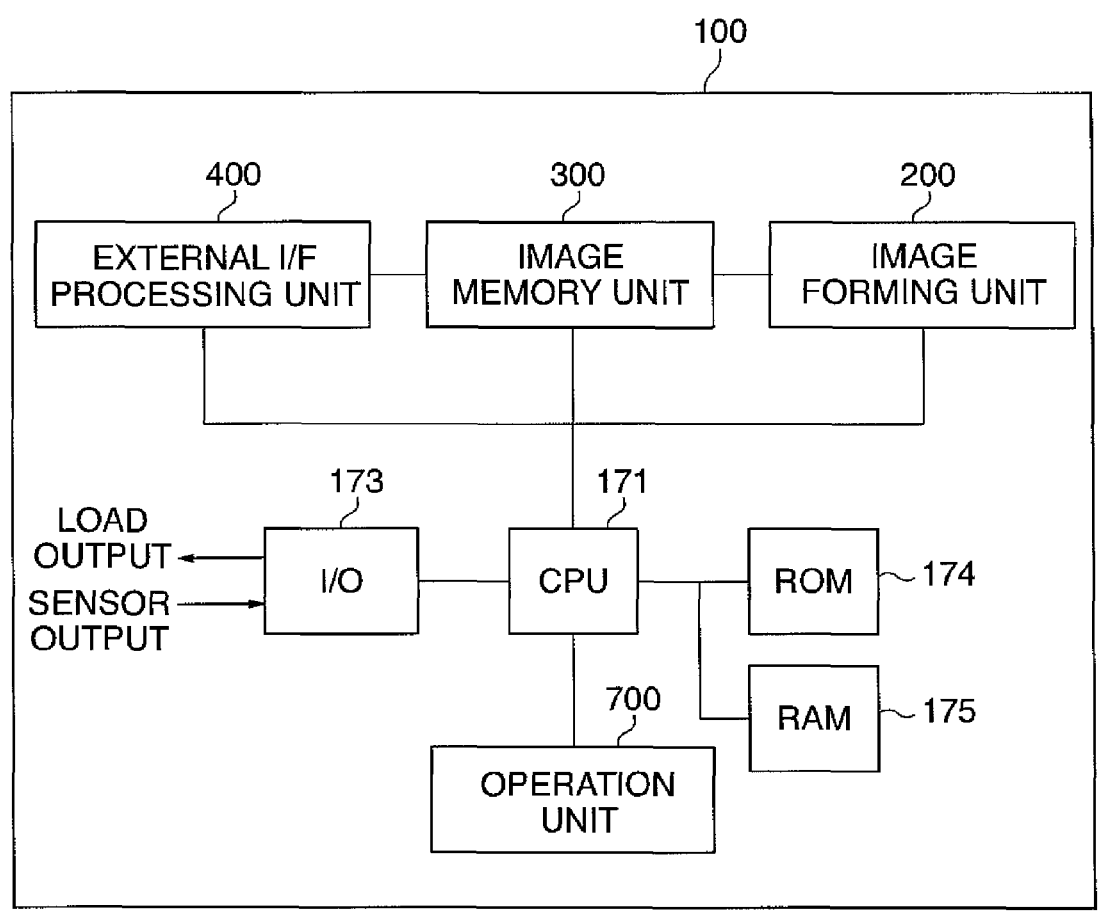
FIG. 2 is a block diagram schematically showing the construction of a control unit of the image forming apparatus.

FIG. 2 schematically shows in block diagram the construction of the control unit 100 of the image forming apparatus.

In FIG. 2, there is shown a CPU 171 for performing the basic control of the entire image forming apparatus. The CPU 171 is connected via address buses, data buses, etc. to a ROM 174 in which control programs are stored, and connected to a RAM 175 in which data, etc. are temporarily stored, and an input/output port (I/O) 173.

The RAM 175 may be a large capacity memory such as, for example, a hard disk or the like. Various loads (not shown) such as motors, clutches, etc. for controlling the image forming apparatus, sensors (not shown) for detecting the position of a recording sheet, and the like are connected to the input/output port 173.

The CPU 171 executes control programs stored in the ROM 174 and sequentially performs input/output control via the input/output port 173 to control the image forming operation.

An operation unit 700 is connected to the CPU 171. The CPU 171 carries out various control in accordance with instructions input from a liquid crystal display section with touch panel and a key input section on the operation unit 700. Operators are able to give instructions to make a changeover of the image forming operation mode and display to the CPU 171 via the key input section 702 (see, for example, FIG. 6A). The CPU 171 causes the operation unit 700 to display the state of the image forming apparatus, and sets the operation mode in accordance with key input.

An external I/F processing unit 400, an image memory unit 300, and an image forming unit 200 are connected to the CPU 171. The external I/F processing unit 400 receives image data from external equipment such as a PC (personal computer), and transmits processed data to the external equipment. The image memory unit 300 performs expanding processing, accumulation processing, and other processing on image data. The image forming unit 200 causes the laser exposure unit 7 to perform exposure processing in accordance with image data transferred from the image memory unit 300.

Next, the details of the image memory unit 300 are described with reference to FIG. 3.

Figure 3:
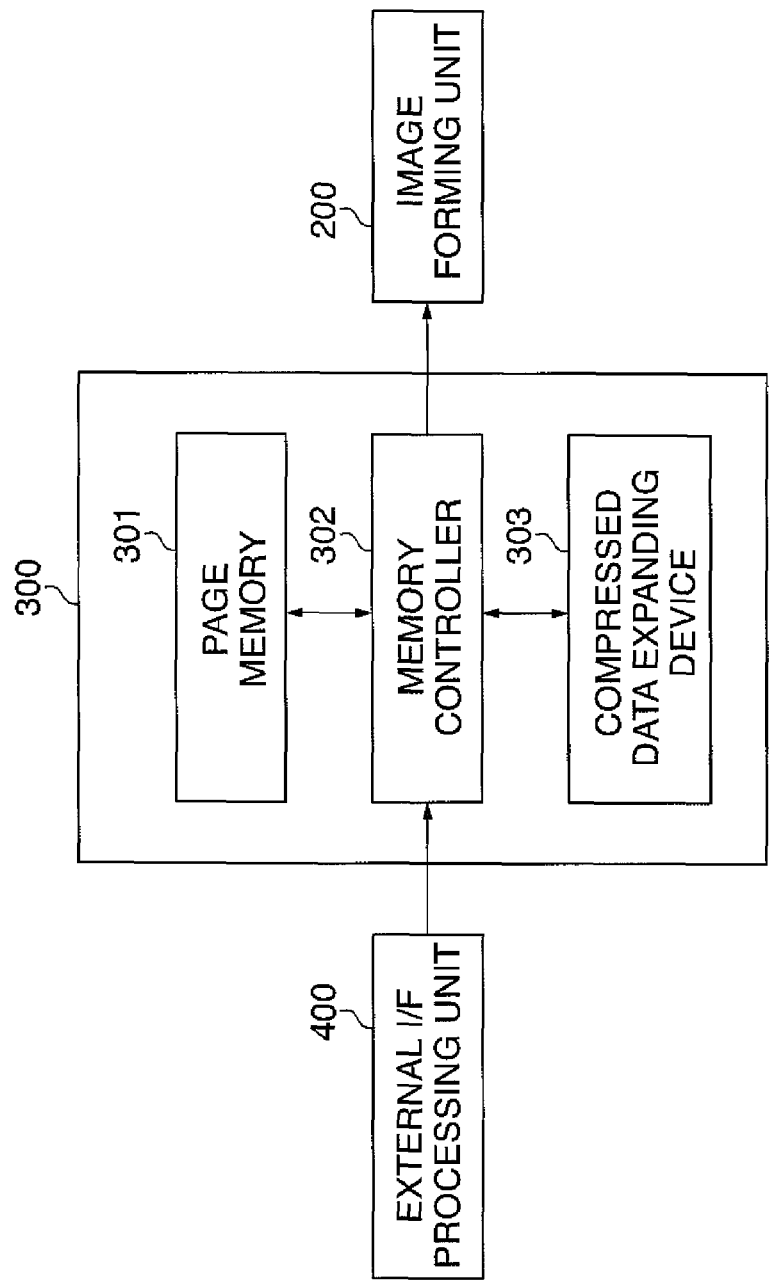
FIG. 3 is a block diagram schematically showing the construction of an image memory unit in the control unit.

FIG. 3 schematically shows in block diagram the construction of the image memory unit 300 in the control unit 100.

In the image memory unit 300, memory access is made for input/output of image such as writing image data received from the external I/F processing unit 400 via the memory controller 302 into the page memory 301 comprised of a DRAM, etc. and reading out image to the image forming unit 200.

The memory controller 302 determines whether or not image data received from the external I/F processing unit 400 is compressed data. If it is determined that the image data is compressed data, the memory controller 302 causes a compressed data expanding device 303 to perform expansion processing. Then, processing of writing the image data into the page memory 301 is performed under the control of the memory controller 302.

The memory controller 302 generates a DRAM refreshing signal which is transmitted to the page memory 301, and arbitrates accesses to the page memory 301 at the time of writing from the image I/F processing unit 400 and reading out to the image forming unit 200. In accordance with instructions given by the CPU 171, the memory controller 302 controls a write address of the page memory 301, a read address of the page memory 301, a read direction, etc.

Next, the details of the external I/F processing unit 400 are described with reference to FIG. 4.

Figure 4:
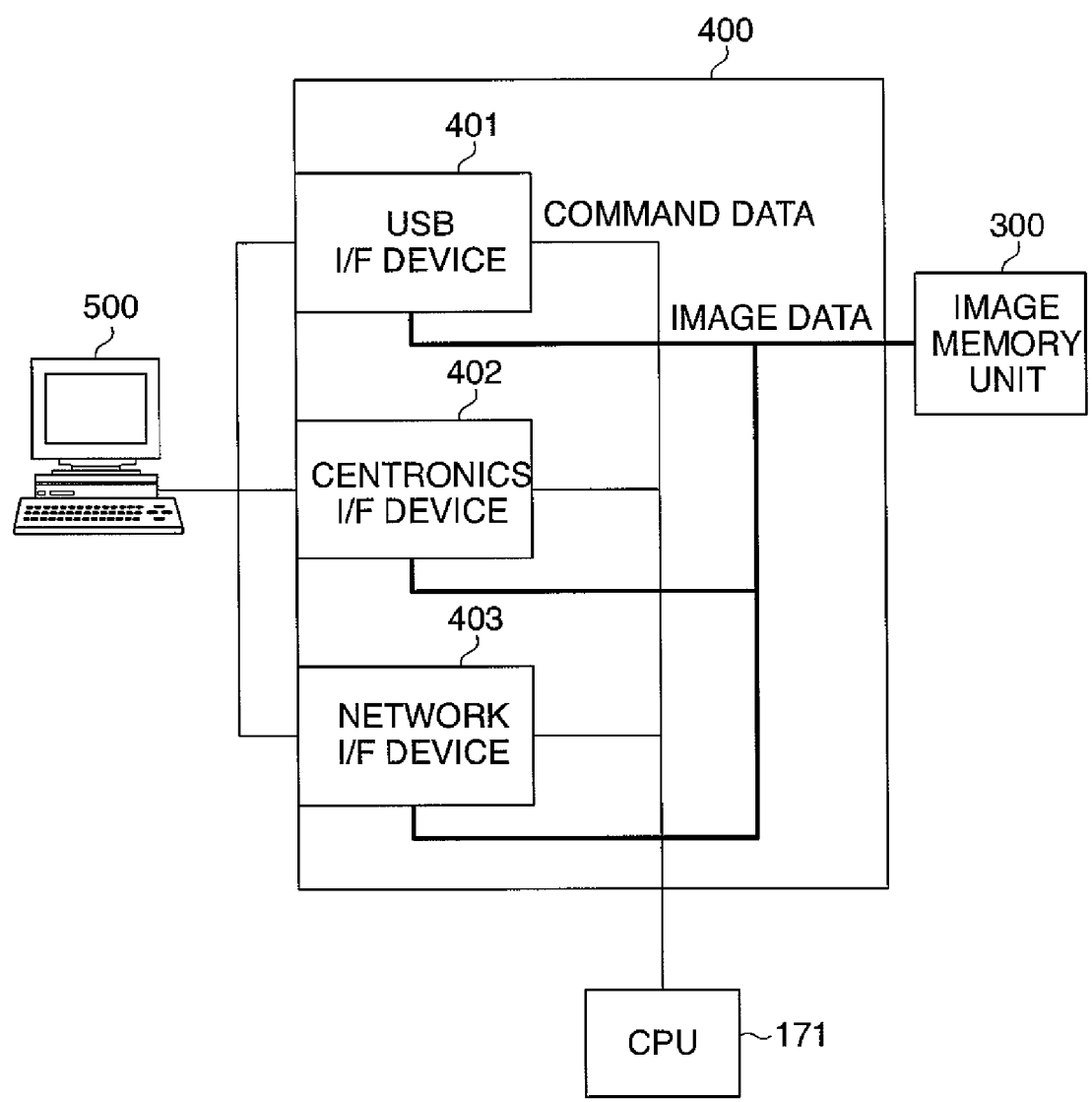
FIG. 4 is a block diagram schematically showing an external I/F processing unit in the control unit.

FIG. 4 schematically shows in block diagram the construction of the external I/F processing unit 400 in the control unit 100.

The external I/F processing unit 400 is connected to an external apparatus 500 comprised of a computer or a workstation. The external I/F processing unit 400 receives image data and print command data transmitted from the external apparatus 500 via a USB I/F device 401, a Centronics I/F device 402, or a network I/F device 403. The external I/F processing unit 400 transmits information representing the state of the image forming apparatus, etc. to the external apparatus 500.

Print command data received from the external apparatus 500 is processed by the CPU 171. The CPU 171 utilizes the image forming unit 200, the input/output port 173, etc., to determine settings and timing for execution of printing.

On the other hand, image data received from the external apparatus 500 is transmitted to the image memory unit 300 in timing determined based on print command data, and processed for image formation by the image forming unit 200.

Next, the details of the operation unit 700 are described with reference to FIGS. 5A and 5B.

Figure 5A:
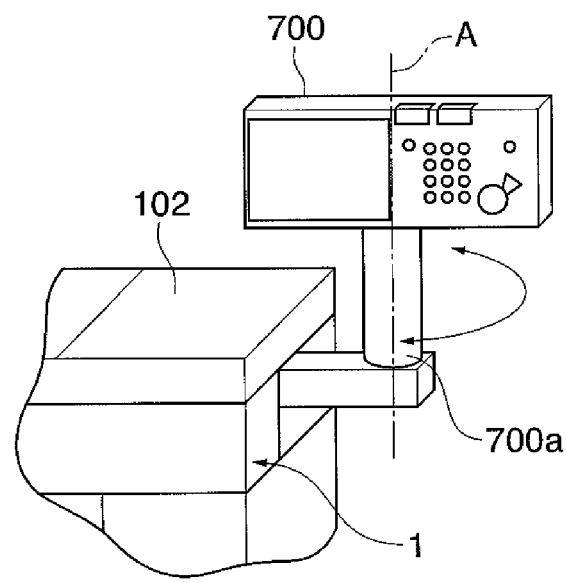
FIG. 5A is a fragmentary perspective view showing an operation unit and its peripheral of the image forming apparatus.
Figure 5B:
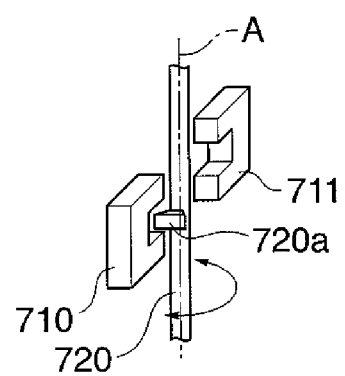
FIG. 5B is a view schematically showing the construction of the operation unit near a pivotal axis thereof.

FIG. 5A shows the external appearance of the operation unit 700 and its peripheral of the image forming apparatus, and FIG. 5B schematically shows a pivot axis and its peripheral in the operation unit 700.

As shown in FIG. 5A, the operation unit 700 is disposed on an L-shaped arm 700a extending from a side surface of the color reader unit 1 and configured to be pivotable around a pivot axis A in substantially a horizontal direction (arrow direction) of the image forming apparatus. By changing the orientation of the operation unit 700, operators are able to operate the operation unit 700 not only from the front side of the image forming apparatus but also from the rear side thereof.

As shown in FIG. 5B, there are disposed inside the arm 700a a support member 720 that supports the operation unit 700 for pivotal motion around the pivot axis A and sensors 710, 711 (pivot position detecting unit) that surround the support member 720 from opposite sides thereof.

The support member 720 has a protrusion 720a formed thereon between the two sensors 710, 711. The CPU 171 is connected via the input/output port 173 to the sensors 710, 711. Each of the sensors 710, 711 is turned on when detecting the protrusion 720a while the support member 720 is pivoted around the pivot axis A. When the sensor 710 (front sensor) detects the protrusion 720a, the CPU 171 determines that the operation unit 700 is pivoted to its front pivot position facing the front side of the image forming apparatus. On the other hand, when the sensor 711 (rear sensor) detects the protrusion 720a, the CPU 171 determines that the operation unit 700 is pivoted to its rear pivot position facing the rear side of the image forming apparatus. Since the sensor 710, 712 and the protrusion 720a each have a width, the pivotal motion of the operation unit 700 up to the front or rear pivot position is determined with a tolerance angular range. It should be noted that the number of sensors is not limited to two but may be three or more. In that case, three or more pivot positions of the operation unit 700 can be detected.

Figure 6B:
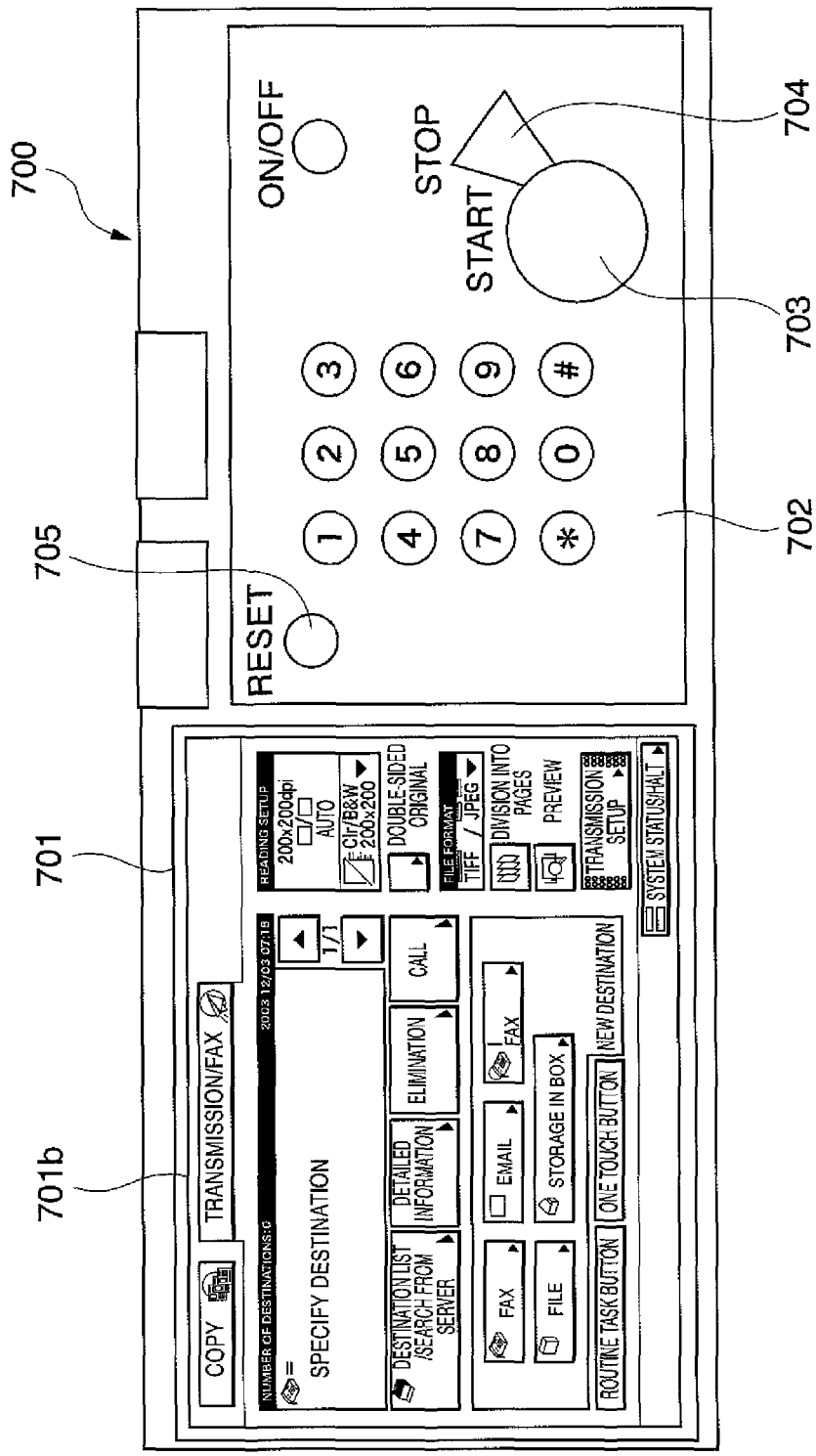
FIG. 6B is a view showing the display section in a state that a transmission/fax screen is displayed thereon.

FIGS. 6A and 6B show in external appearance the liquid crystal display section with touch panel and the key input section of the operation unit 700. FIG. 6A shows the liquid crystal display section in a state where a copy screen is displayed thereon, and FIG. 6B shows the display section in a state where a transmission/fax screen is displayed thereon. FIG. 7 shows an initial-screen setting screen displayed on the display section.

As described above, the operation unit 700 is divided into the liquid crystal display section 701 with touch panel and the key input section 702. The liquid crystal display section 701 with touch panel is for accepting an operator's input of the content of processing to be performed and for providing display of processing-related information or notification such as warning. The key input section 702 is for accepting an operator's input of the content of processing to be performed. The result of the key input is displayed on the display section 701.

A start key 703 accepts an operator's instruction to start the execution of processing. A stop key 704 accepts an operator's instruction to terminate the execution of the processing instructed by the operator by operating the start key 703. A reset key 705 accepts an instruction to clear the content of the processing having been input at the touch panel of the display section 701 and/or the key input section 702 and an instruction to return the input content and the displayed content to initial states.

In the image forming apparatus of this embodiment, there are a plurality of initial screens for various processes (functions) such as copying and facsimile transmission. One of the initial screens is a copy screen 701a shown in FIG. 6A for display and input for the copying process. Another initial screen is a transmission/fax screen 701b shown in FIG. 6B for display and input for the facsimile transmission process. The operator is able to select a screen to be displayed on the operation unit 700 from among the initial screens for various processes performable by the image forming apparatus, whereby the settings of process contents can be set.

The display and input for various processes not only indicate the display and input at the liquid crystal display section 701 with touch panel, but also indicate other operations such as determining the number of copies in accordance with a key input value from the key input section 702 in a state that the copy screen 701a is displayed and determining a facsimile transmission destination telephone number in accordance with a key input value from the key input section 702 with the transmission/fax screen 701b displayed.

The image forming apparatus is configured that screens to be displayed on the display section 701 can individually be set beforehand on an initial-screen setting screen 701c shown in FIG. 7 such that these screens respectively correspond to pivot positions of the operation unit 700. It should be noted that upon shipment of the image forming apparatus, the copy screen has been set as the initial screen without regard to the pivot position of the operation unit 700. However, on the initial-screen setting screen, each operator is able to arbitrarily change the displayed contents of the initial screen in a user mode (not shown) for setting the details of the image forming apparatus. The initial screen set on the initial-screen setting screen is battery backed up for storage and retained even when the power is off.

Next, a description will be given of the way of setting an initial screen to be displayed on the operation unit 700 when the unit 700 faces the front or rear of the image forming apparatus, as an example of the initial screen setting method.

Figure 8B:
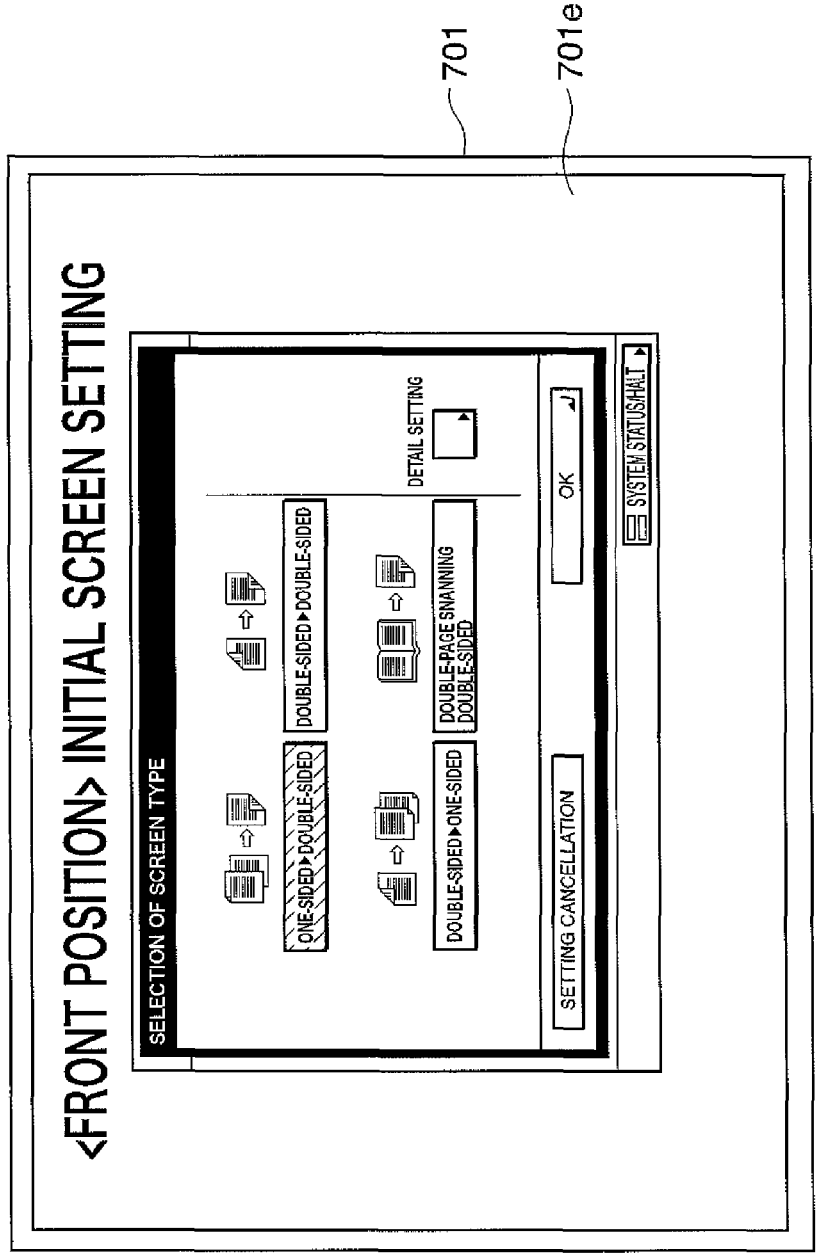
Figure 9A:
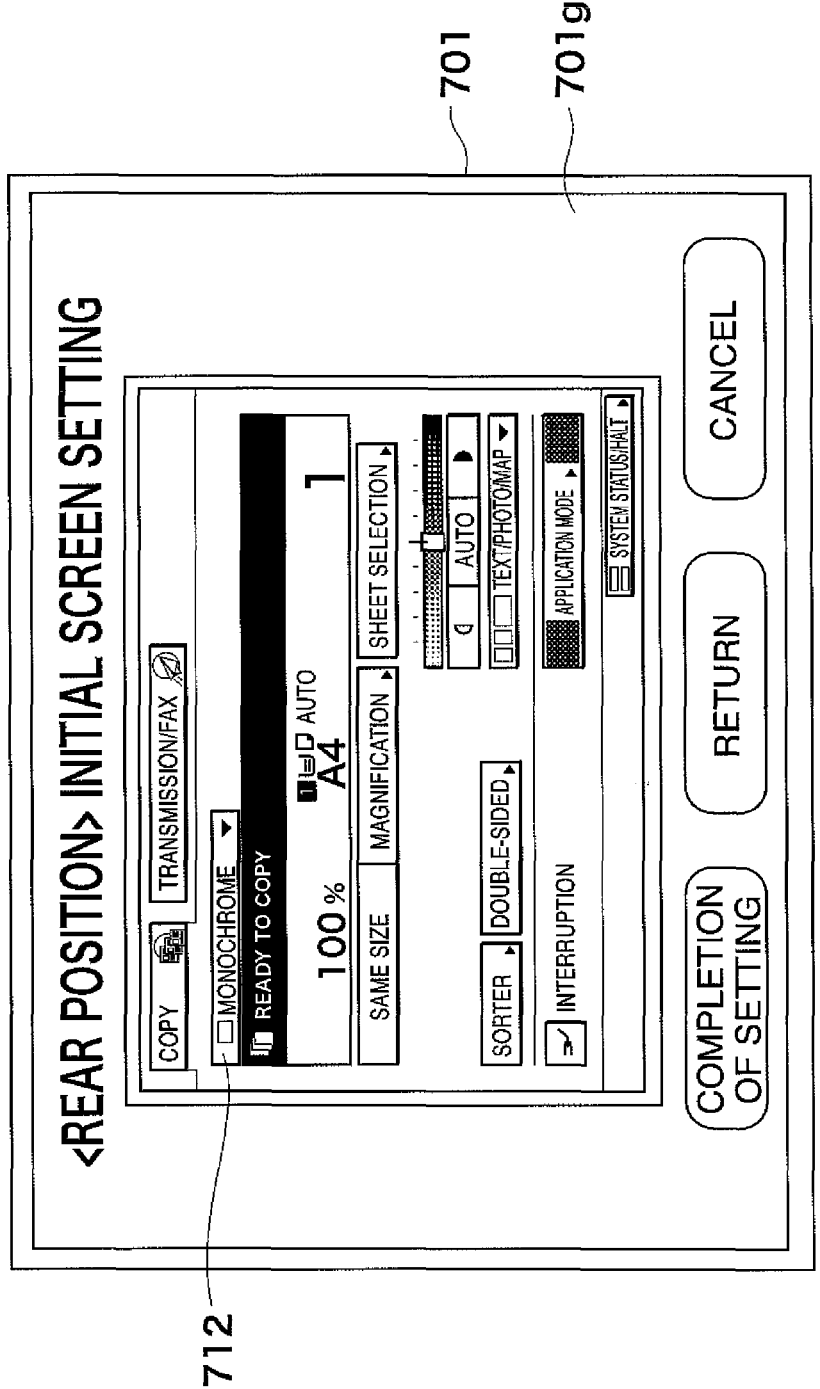
Figure 9B:
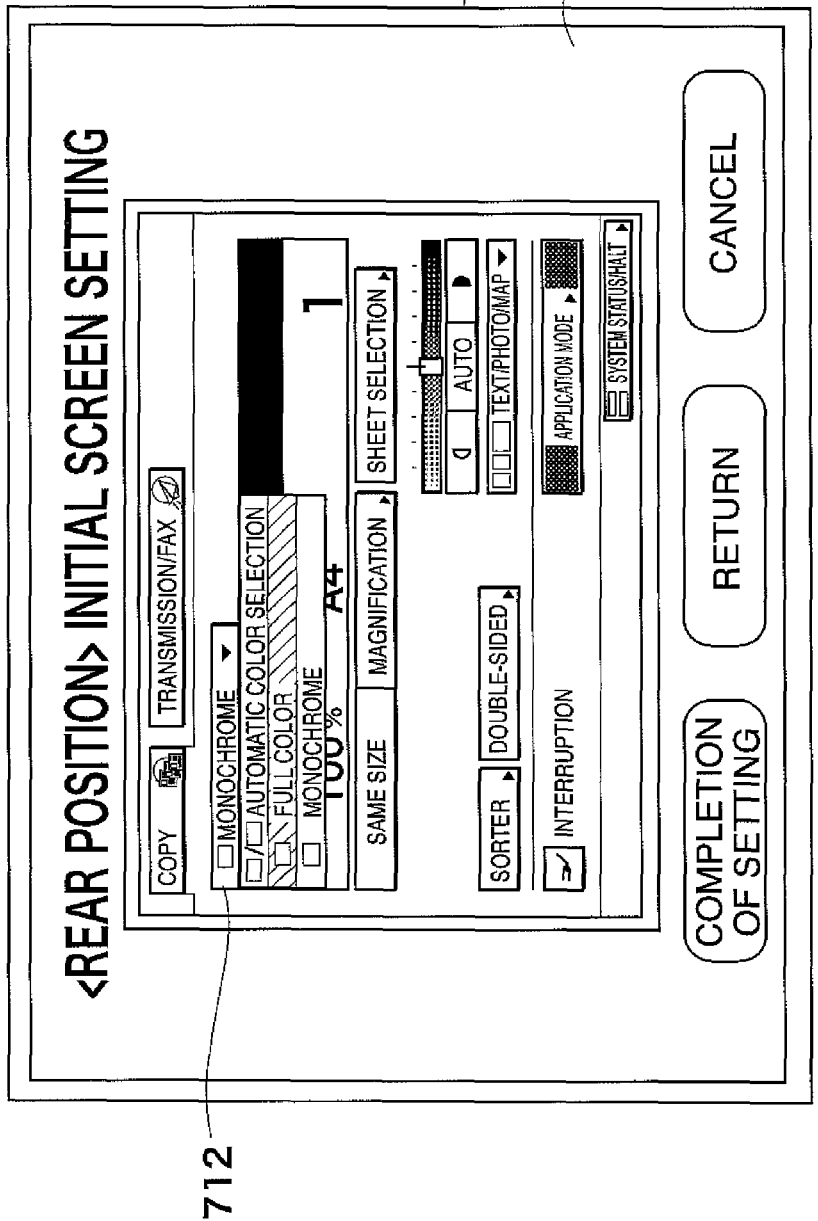

FIGS. 8A to 8C show an example of the way of setting the initial screen to be displayed on the operation unit 700 when the unit 700 is pivoted to the position facing the front of the image forming apparatus. FIGS. 9A to 9C show an example of the way of setting the initial screen to be displayed on the operation unit 700 when the unit 700 is pivoted to the position facing the rear of the image forming apparatus.

First, an operator activates a user mode, not shown, and causes the initial-screen setting screen 701c of FIG. 7 to be displayed, in which the operator selects a type of initial screen to be displayed on the display section 701 when the operation unit 700 is at the position facing the front of the image forming apparatus and a type of initial screen to be displayed thereon when the unit 700 is at the position facing the rear of the apparatus. It is assumed here that an option "Copy Screen" indicated immediately to the right of the indication "Front Position" and an option "Copy Screen" indicated immediately to the right of the indication "Rear Position" are selected. Subsequently, when a "Next" key is pressed, a shift is made to an initial-screen setting screen for front position 701d in FIG. 8A on which registration settings of a default mode of copy function can be carried out.

For example, in a case where a default setting of double-sided copying to determine whether or not image formation should be made on both the front and back sides of a recording sheet is changed from "One-sided" to "From One-sided to Double-sided", an option "Double-sided" is selected. As a result, a shift is made to a double-sided setting selecting screen 701e shown in FIG. 5B. The "From One-sided to Double-sided" indicates a mode in which images of one-sided originals are double-sided copied to sheets. Then, an option "From One-sided to Double-sided" is selected and an "OK" key is pressed. As a result, returning is made to a setting screen 701f shown in FIG. 5C. Subsequently, if a "Setting Completion/Next Position Setting" key is pressed, the initial screen setting for front position is completed, and a shift is made to an initial-screen setting screen for rear position 701g shown in FIG. 9A.

For example, to change a color mode setting from "Monochrome" to "Full Color", an option "Color Mode Setting" 712 is selected, and a shift is made to a color mode setting screen 701h shown in FIG. 9B. The "Monochrome" indicates a mode in which an original image is copied in black and white, and the "Full Color" indicates a mode in which an original image is color-copied. When an option "Full Color" is selected, returning is made to a setting screen 701i shown in FIG. 9C. If a "Setting Completion" key is depressed, the initial screen setting for rear position is completed.

As a result of the above described setting operations on the initial screen, the content 713 of the setting screen 701f is registered as the initial screen for front position, and the content 713 of the setting screen 701i is registered as the initial screen for rear position.

In the above, the case where the double-sided setting and the color mode setting are changed has been described by way of example. In that case, the default mode can arbitrarily be changed by making operations similar to those performed on the setting screen for copy function. If a change in the settings of initial screen is unnecessary, the "Setting Completion/Next Position Setting" key or the "Setting Completion" key on the setting screen 701d or 701g is depressed. In the case of an option "Transmission/Fax" being selected on the setting screen 701c, the default mode can be registered by making operations similar to the setting operations performed prior to actual transmission/fax.

Next, the process flow for controlling display and input at the operation unit 700 will be described with reference to flowcharts shown in FIGS. 10 and 11.

Figure 10:
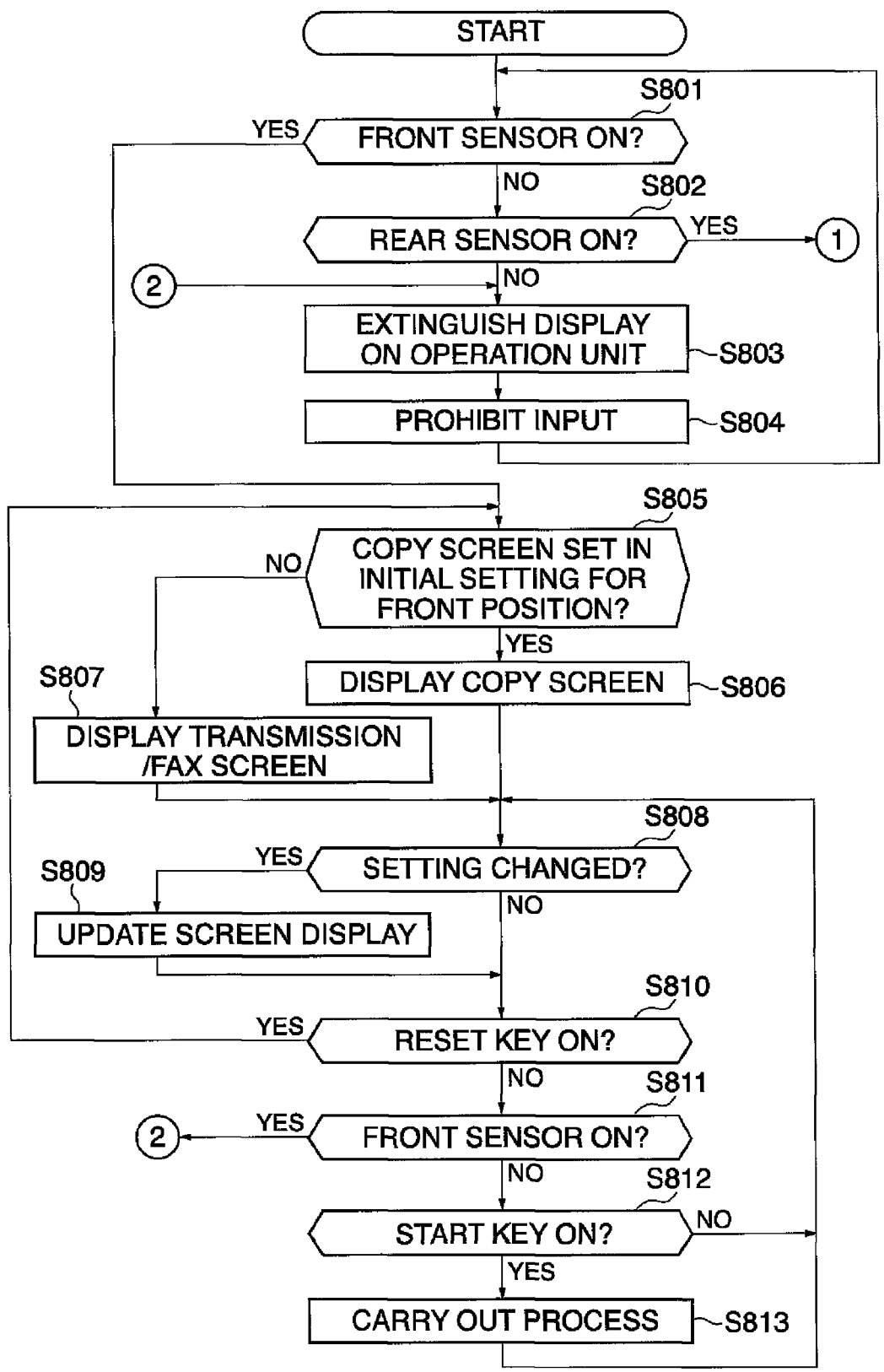
FIG. 10 is a flowchart showing a part of a process flow for control of display and input at the operation unit.
Figure 11:
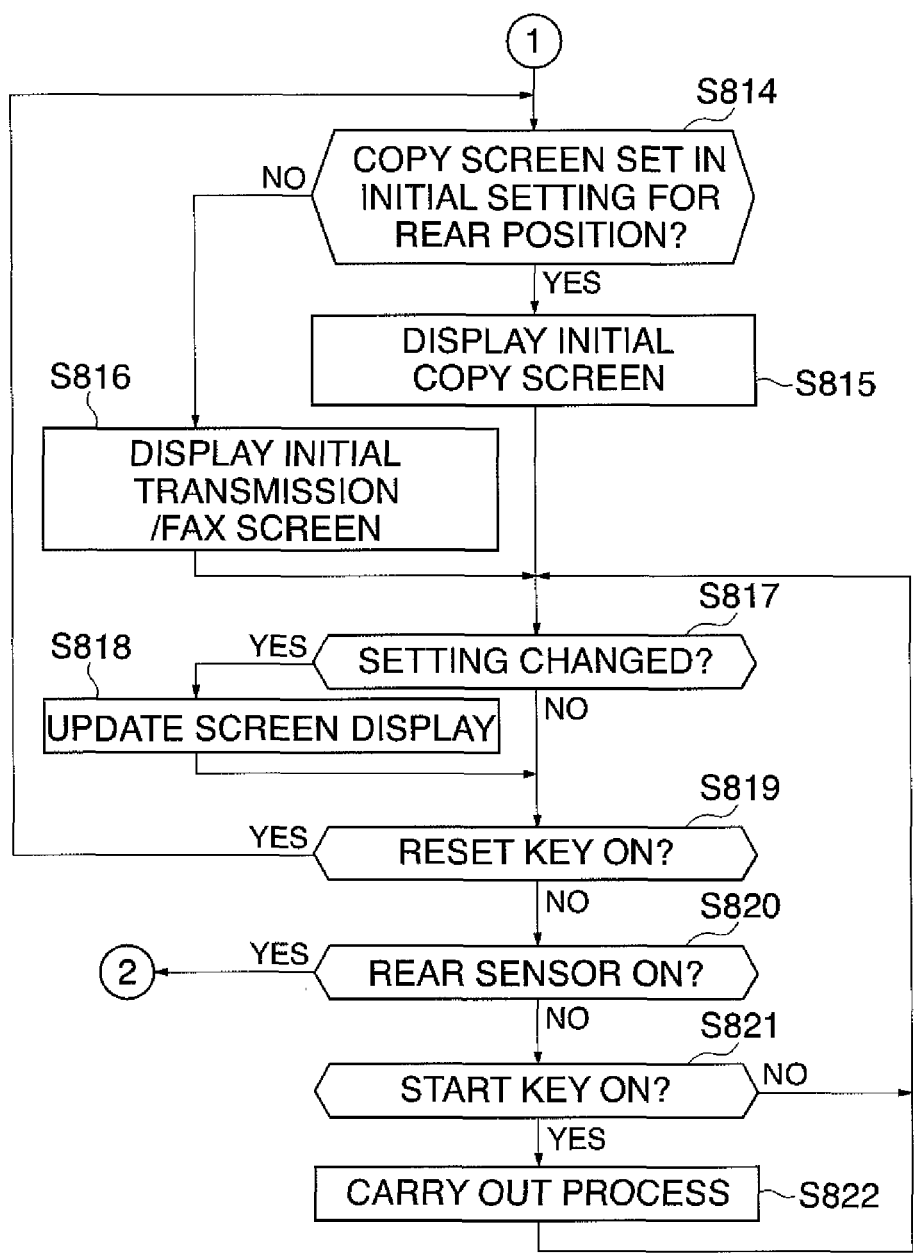
FIG. 11 is a flowchart showing the remaining part of the process flow for control of display and input at the operation unit.

FIGS. 10 and 11 show in flowcharts the process flow for control of display and input at the operation unit 700. The control process is realized by the CPU 171 by reading out and executing a program stored in the ROM 174.

Referring to FIG. 10, when the power to the image forming apparatus is turned on, the CPU 171 determines based on outputs of the sensors 710, 711 whether the operation unit 700 is at its front pivot position facing the front of the image forming apparatus or at its rear pivot position facing the rear of the apparatus (steps S801, S802).

If the operation unit 700 is not at the pivot position facing the front of the image forming apparatus nor at the pivot position facing the rear of the apparatus, the CPU 171 causes the liquid crystal display section 701 with touch panel on the operation unit 700 to be extinguished in order to prohibit erroneous display and input (step S803). Then, the CPU 171 prohibits an operation input at the display section 701 and the key input section 702 (step S804), and shifts to a state for awaiting the detection by the front sensor 710 or the rear sensor 711.

On the other hand, if the front sensor 710 detects the protrusion 720a on the support member 720 (YES to step S801), the CPU 171 determines that the operation unit 700 is at the pivot position facing the front of the image forming apparatus. In accordance with the initial screen for front position set in advance, the CPU 171 causes the copy screen or the transmission/fax screen to be displayed on the display section 701 (steps S805 to S807). Whereupon the CPU 171 shifts to a state for waiting an operator's input of process content to be implemented. The setting of the initial screen for front position is performed by the above-described initial screen setting method.

When a processing mode relating to the copy function or the transmission/fax function is input at the touch panel of the display section 701 and the key input section 702, the CPU 171 updates the screen display in accordance with the input content (steps S808, S809).

If the reset key 705 on the key input section 702 is depressed (YES to step S810), the CPU 171 clears the content of the to-be-implemented process input at the display section 701 and the key input section 702. Then the CPU 171 returns to step S805 where the initial screen is displayed on the display section 701, whereby the input content and the display content are restored to the initial states.

When the operation unit 700 is pivoted by the operator so that the front sensor 710 cannot detect the protrusion 720a on the support member 720 (YES to step S811), the CPU 171 determines that the operation unit 700 is not at the pivot position facing the front of the image forming apparatus.

In step S803, the CPU 171 causes the display section 701 to be extinguished, as described above, in order to prevent erroneous display and input. The CPU 171 inhibits an operation input at the touch panel of the display section 701 and the key input section 702 (step S804), and then shifts to a state for waiting for the detection by the front sensor 710 or the rear sensor 711.

Next, if it is determined in step S812 that the start key 703 on the key input section 702 is depressed, the CPU 171 carries out a process in accordance with the input processing mode (step S813). Upon completion of the process, the flow returns to step S808 in which the CPU 171 shifts to a state for waiting for an operator's input of processing mode.

When the protrusion 720*a* on the support member 720 is not detected by the front sensor 710 but detected by the rear sensor 711 (YES to step S802), the CPU 171 determines that the operation unit 700 is at the pivot position facing the rear of the image forming apparatus. Then, in accordance with the predetermined initial screen setting for rear position, the CPU 171 causes the copy screen or the transmission/fax screen to be displayed on the display section 701 (steps S814 to S816). Whereupon the CPU 171 shifts to a state for waiting for an operator's input of processing mode. The initial screen setting for rear position is carried out by the above-described setting method.

Next, if a processing mode is input at the touch panel of the display section 701 and the key input section 702, the CPU 171 updates the screen display in accordance with the input content (steps S817, S818).

If the reset key 705 on the key input section 702 is depressed (YES to step S819), the CPU 171 clears the processing mode input at the touch panel of the display section 701 and the key input section 702. Whereupon the flow returns to step S814 where the CPU 171 causes the initial screen to be displayed on the display section 701, so that the input content and the display content are restored to the initial states.

When the operation unit 700 is pivoted by the operator, and it is determined in step S820 that the rear sensor 711 cannot detect the protrusion 720*a* on the support member 720, the flow proceeds to step S803 in FIG. 10.

When the start key 703 on the key input section 702 is depressed (YES to step S821), the CPU 171 carries out the process in accordance with the input processing mode (step S822). Upon completion of the process, the flow returns to step S817 where the CPU 171 shifts to a state for waiting for an operator's input of processing mode.

When the operation unit 700 is pivoted by the operator, and it is determined in step S811 that the rear sensor 711 detects that the operation unit 700 is pivoted up to its rear position, the processing mode input at the operation unit 700 placed at the front position (first pivot position) may be cleared (step S811A in FIG. 16). Specifically, the CPU 171 clears the input on the screen of the operation unit 700 displayed before the unit 700 is pivoted to another pivot position (here, the rear position) Then, the CPU 171 causes the operation unit 700 to display thereon an initial screen registered in advance and corresponding to the rear position (second pivot position) (step S811B in FIG. 16).

When the operation unit 700 is pivoted by the operator, and it is determined in step S820 that the front sensor 710 detects that the operation unit 700 is pivoted to the front position, the CPU 171 may clear the processing mode input from the operation unit 700 placed at the rear position (second pivot position) (as in the case shown in FIG. 16). Specifically, the CPU 171 clears the input on the screen displayed on the operation unit 700 before the unit 700 is pivoted up to another pivot position (here, the front position). Whereupon the CPU 171 causes the operation unit 700 to display thereon the initial screen set beforehand and corresponding to the front position (second pivot position).

With the first embodiment, the image forming apparatus is disposed on the arm extending from the apparatus, and includes the operation unit 700 configured to be pivotable around the support member 720 in substantially the horizontal direction and the sensors 710, 711 for detecting the pivot position of the operation unit 700. In accordance with the pivot position of the operation unit 700 detected by the sensors 710, 711, a screen set beforehand on the initial-screen setting screen is displayed on the operation unit 700, whereby the installability (the degree of freedom of installation environment) of the image forming apparatus in offices or the like and the operability of the apparatus can be improved.

In the first embodiment, an operation input is prohibited when the operation unit 700 is pivoted and the front sensor 710 cannot detect the protrusion 720*a*. However, the operation input and display may be permitted until the rear sensor 711 detects the protrusion 720*a*. Similarly, when the operation unit 700 is pivoted and the rear sensor 711 cannot detect the protrusion 720*a*, the operation input and display at the rear position may be permitted until the front sensor 710 detects the protrusion 720*a*.

Second Embodiment

An image forming apparatus according to a second embodiment of this invention is the same in construction as the image forming apparatus according to the above described first embodiment. Like parts which are the same or similar in construction to the first embodiment will be denoted by like reference numerals, and explanations thereof will be omitted. In the following, only points different from the first embodiment will be described.

In the second embodiment, a polygon motor in the laser exposure unit 7 is configured to be large in moment of inertia in order to rotatably drive the polygon mirror with stability. As a result, it takes time to start the polygon motor. Generally, a time period from 3 to 7 seconds is required to start the motor from a stopped state or rise the motor speed from low to high. When a heating source in the fixing unit 207 is in a cold state, it takes time to reach a temperature above which toner can be fixed to a recording sheet from the start of a fixing temperature adjustment. By reducing the start-up times, a fast copy time (FCOT) can be shortened. For example, if a preparatory operation such as starting-up the polygon motor or starting the fixing temperature adjustment is performed when an operation input for copying is effected by the operator by operating the operation unit 700, the preparation for image formation can be completed earlier than when the preparatory operation is started after receipt of an instruction for copying, making it possible to shorten the fast copy time.

Next, with reference to a flowchart of FIG. 12, an explanation will be given of the process flow in which prior to an image forming operation, the preparatory operation for image formation is selectively carried out in accordance with whether or not the operation unit 700 is pivoted.

Figure 12:
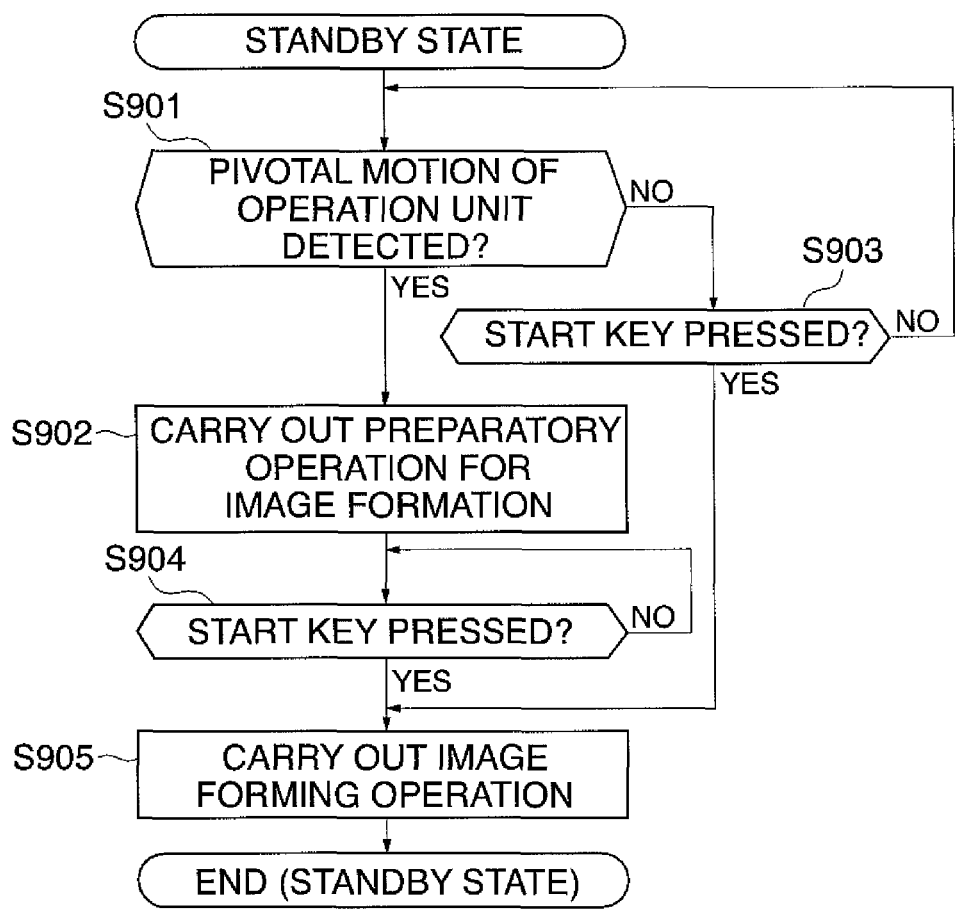
FIG. 12 is a flowchart schematically showing a control process performed by an image forming apparatus according to a second embodiment of this invention.

FIG. 12 schematically shows in flowchart a control process implemented by the image forming apparatus according to the second embodiment. The control process is realized by the CPU 171 by reading out and executing a program stored in the ROM 174.

Referring to FIG. 12, the image forming apparatus is in a standby state in which the apparatus waits in a condition capable of performing the image formation. In the standby state, the support member 720 is in a state that the protrusion 720 formed thereon is detected by the sensor 710 or 711. In other words, the operation unit 700 is at a position facing the front or rear of the image forming apparatus. In this state, whether or not the operation unit 700 is pivoted by an operator is determined, i.e., whether or not the protrusion 720a on the support member 720 cannot be detected by the sensors is determined. If there is a change in the detection state by one or both of the sensors, the CPU 171 determines in step S901 that the operation unit 700 is pivoted, and proceeds to step S902.

In step S902, the CPU 171 starts driving the polygon motor in the laser exposure unit 7 or initiates the start-up of the fixing unit 207 (i.e., rising from a standby temperature to a fixing temperature), thereby carrying out a preparatory operation for image formation. The image forming apparatus is brought into a state for waiting for an operator's input at the operation unit 700.

Next, the CPU 171 waits for the start key 703 being depressed (step S904). When the start key is depressed, the CPU 171 causes the image forming unit 200 to carry out the image forming operation in accordance with the processing mode input to the operation unit 700 (step S905). When the image formation processing is completed, the image forming apparatus is returned to its standby state.

On the other hand, if it is determined in step S901 that a change in pivotal state of the operation unit 700 is not detected by the sensor 710 or 711, the CPU 171 waits for the start key 703 being depressed (step S903). When the start key 703 is depressed, the flow proceeds to step S905 in which the image forming operation is carried out.

In a case where the operation unit 700 is pivoted by the operator, there is a high possibility that the start key 703 will be depressed to start the image formation processing after some operation input being made at the operation unit 700. Thus, as described above, the preparatory operation for image formation, such as starting up a driving of the polygon motor or a heating of the fixing unit whose start-up time largely affects a fast copy time, is started in timing in which the pivotal motion of the operation unit 700 is detected. Specifically, the preparatory operation for image formation is started in conjunction with the pivotal motion of the operation unit 700 being detected. As a result, it is possible to shorten the fast copy time and improve the usability.

Third Embodiment

Figure 13:
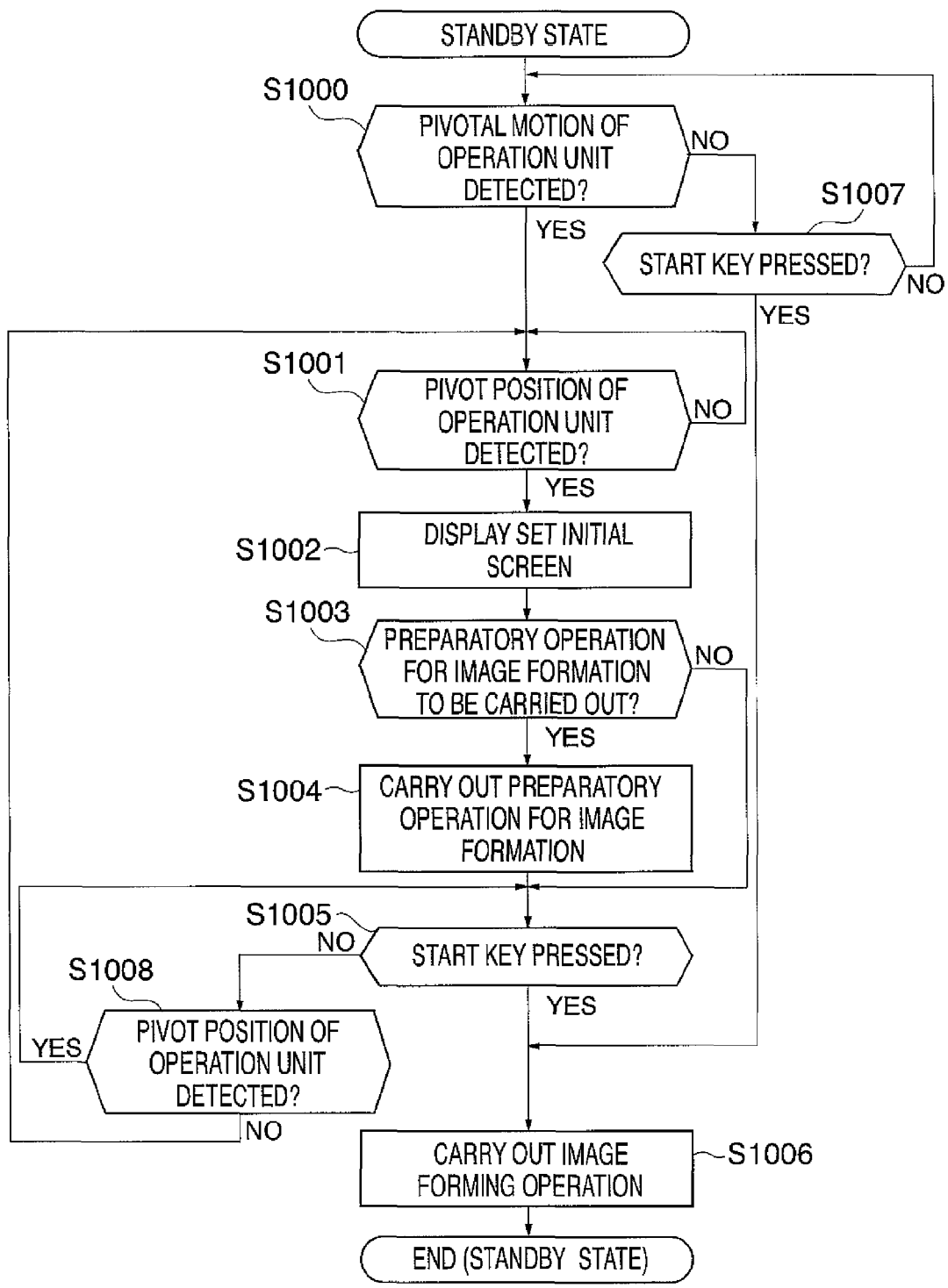
FIG. 13 is a flowchart schematically showing a control process performed by an image forming apparatus according to a third embodiment of this invention.

FIG. 13 schematically shows in flowchart a control process performed by an image forming apparatus according to a third embodiment of this invention. The control process is realized by the CPU 171 by reading out and executing a program stored in the ROM 174.

Referring to FIG. 13, the image forming apparatus is in a standby state in which the apparatus waits in a condition capable of performing the image formation. In the standby state, the protrusion 720a on the support member 720 is in a state detected by the sensor 710 or 711, i.e., the operation unit 700 is in a state facing the front or rear side of the image forming apparatus. In this state, whether or not the operation unit 700 is pivoted by an operator is determined, i.e., whether or not the protrusion 720a on the support member 720 is no longer detected by the sensors is determined. If it is determined in step S1000 that the protrusion 720a on the support member 720 becomes no longer detected by the sensors, the CPU 171 determines based on outputs of the sensors 710, 711 whether or not the pivot position of the operation unit 700 is detected (step S1001). Specifically, if the pivot position cannot be detected by the sensors 710, 711 and thereafter detected by the sensor other than that sensor by which the pivot position has previously been detected, the CPU 171 determines that the pivot position of the operation unit 700 is changed.

When it is determined in step S1001 that the pivot position of the operation unit 700 is changed, the CPU 171 causes the display section 701 to display thereon the initial screen set beforehand for the position of the operation unit 700 facing the front or rear of the image forming apparatus (step S1002).

Next, the CPU 171 determines whether the function selected upon detection of the pivot position of the operation unit is a copy function or a transmission/fax function (step S1003). This determination is equivalent to determine whether or not the image forming unit 200 should be caused to perform the preparatory operation for image formation. As a result, if the function selected by the pivotal motion of the operation unit 700 is the copy function, the CPU 171 causes the image forming unit 200 to perform the preparatory operation for image formation (step S1004). On the other hand, if the selected function is the transmission/fax function not accompanying the image formation, the CPU 171 does not cause the unit 200 to perform the preparatory operation for image formation, and proceeds to step S1005.

In step S1005, the CPU 171 determines whether or not the start key is depressed. If the start key 703 is depressed, the CPU 171 causes the image forming unit 200 to carry out the image forming operation in accordance with the processing mode input at the operation unit 700 prior to the start key being depressed (step S1006). Upon completion of the image forming operation, the image forming apparatus is returned to its standby state again.

On the other hand, if it is determined in step S1005 that the start key 703 is not depressed, the CPU 171 determines whether or not the pivot position of the operation unit 700 is detected by the sensor 710 or 711 (step S1008). If the pivot position of the operation unit 700 cannot be detected by the sensors 710, 711, the CPU 171 determines that the operation unit 700 is pivoted. In that case, the flow returns to step S1001. If it is determined in step S1000 that a pivotal motion of the operation unit 700 is not detected, the CPU waits for the start key 703 being depressed (step S1007). If it is determined in step S1007 that the start key 703 is depressed, the flow proceeds to step S1006.

When the operator pivots the operation unit 700, there is a high possibility that the operator will input an instruction to start the image formation. By performing the preparatory operation for image formation prior to the image forming operation, a fast copy time can be shortened. On the other hand, in the case of transmission/fax or other process not accompanying the image formation processing, the preparatory operation for image formation becomes a wasteful operation and can shorten the service life of the image forming apparatus.

Thus, it is determined whether or not the function selected by the pivotal motion of the operation unit 700 is a function that requires the preparatory operation for image formation, and if required, the preparatory operation for image formation is carried out, whereby a fast copy time can be shortened and usability can be improved. If the preparatory operation for image formation is unnecessary, a wasteful preparatory operation for image formation is not carried out, whereby a reduction in the service life of the image forming apparatus can be prevented.

Fourth Embodiment

An image forming apparatus according to a fourth embodiment is similar in construction to the image forming apparatuses according to the second and third embodiments. Like parts are denoted by like reference numerals, and explanations thereon will be omitted.

In the third embodiment, when the operation unit 700 is at a position facing the front or rear of the image forming apparatus, display is changed over to a predetermined initial screen and a preparatory operation for image formation is performed in accordance with the screen after the changeover. In the fourth embodiment, if the pivot position of the operation unit 700 is not determined, control is made to extinguish the display on the operation unit 700 to thereby inhibit the operation input thereat.

Figure 14:
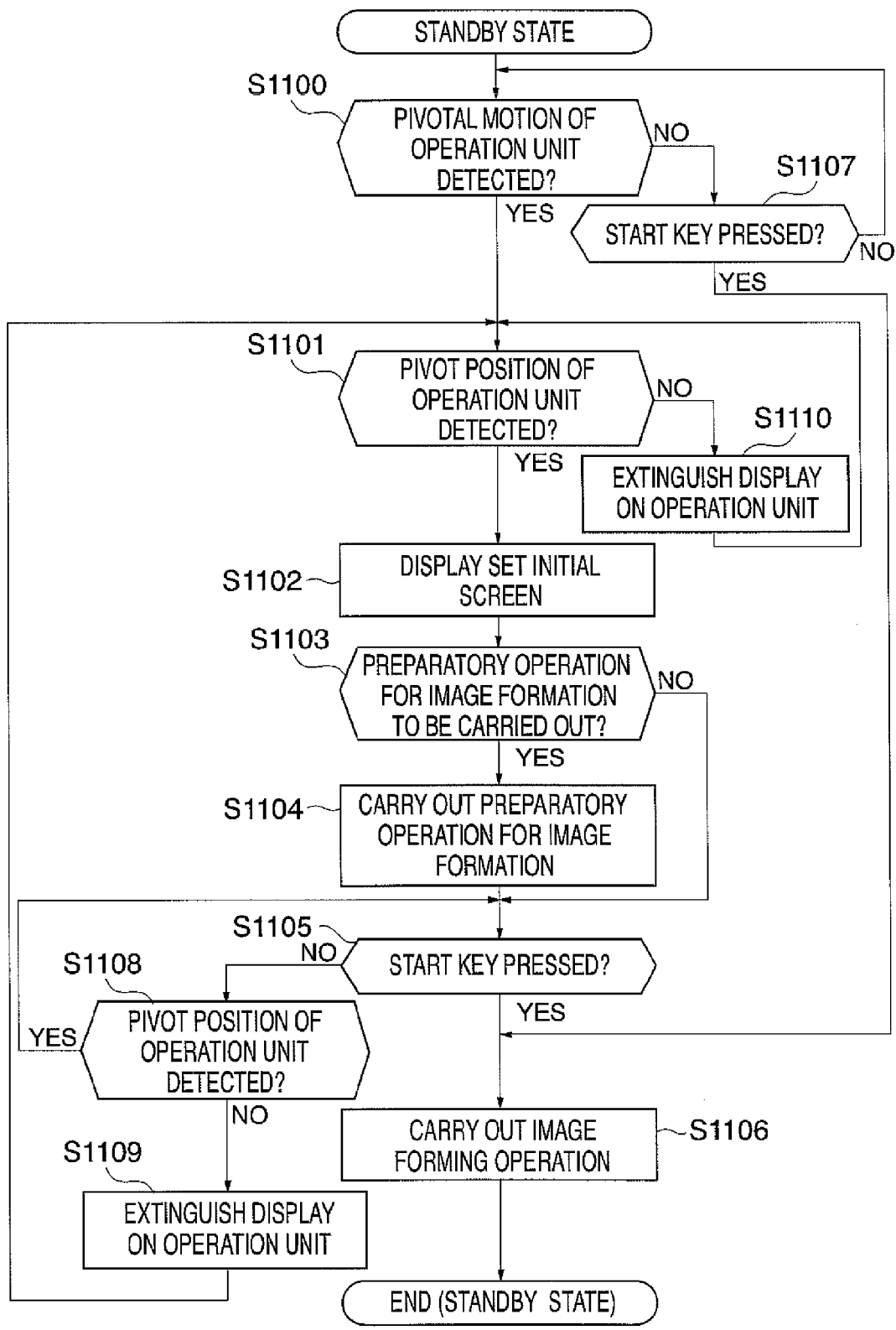
FIG. 14 is a flowchart schematically showing a control process performed by an image forming apparatus according to a fourth embodiment of this invention.

FIG. 14 schematically shows in flowchart the control process performed by the image forming apparatus according to the fourth embodiment. The control process is realized by the CPU 171 by reading out and executing a program stored in the ROM 174.

Referring to FIG. 14, the image forming apparatus is in a standby state in which the apparatus waits in a condition capable of performing the image formation. In the standby state, the protrusion 720a on the support member 720 is detected by the sensor 710 or 711. In other words, the operation unit 700 is at a position where it faces the front or rear of the image forming apparatus. In this state, whether or not the operation unit 700 is pivoted by the operator is determined, i.e., whether or not the protrusion 720a on the support member 720 cannot be detected by the sensors is determined (step S1100). If it is determined in step S1100 that the protrusion 720a is not detected by the sensors 710, 711, the CPU 171 determines whether or not the pivot position of the operation unit 700 is detected by the sensor 710 or 711 (step S1101). If the pivot position of the operation unit 700 is not detected by the sensor 710 or 711 and the pivot position of the operation unit 700 cannot be determined, the CPU 171 causes the display section 701 on the operation unit 700 to extinguish (step S1110).

On the other hand, if it is determined in step S1101 that the pivot position of the operation unit 700 is detected by the sensor 710 or 711, the CPU 171 causes the operation unit 700 to display thereon an initial screen set beforehand and corresponding to the detected pivot position of the operation unit 700 (step S1102).

Next, on the basis of the displayed initial screen, i.e., the function (copy or transmission/fax) selected by the pivotal motion of the operation unit, the CPU 171 determines whether or not the preparatory operation for image formation must be carried out (step S1103). If it is determined that the copy function is selected, the CPU 171 causes the image forming unit 200 to perform the preparatory operation for image formation (step S1104). On the other hand, if the transmission/fax function not accompanying the image formation is selected, the CPU 171 does not cause the unit 200 to perform the preparatory operation for image formation, and proceeds to step S1105.

In step S1105, the CPU 171 determines whether or not the start key is depressed by the operator (step S1105). If it is determined that the start key 703 is depressed, the CPU 171 causes the image forming unit 200 to perform the image forming operation (step S1106). Upon completion of the image forming operation, the image forming apparatus is returned to its standby state again.

On the other hand, if it is determined in step S1105 that the start key 703 is not depressed, the CPU 171 determines whether or not the pivot position of the operation unit 700 is detected by the sensor 710 or 711 (step S1008). If it is determined that the pivot position cannot be detected, the CPU 171 determines that the operation unit 700 is pivoted and the pivot position of the operation unit 700 cannot be determined, and therefore, causes the display section 701 to extinguish (step S1109), whereupon the flow returns to step S1101. If it is determined in step S1100 that a pivotal motion of the operation unit 700 is not detected, the CPU 171 waits for the start key 703 being depressed (step S1107). When the start key 703 is depressed, the flow proceeds to step S1106.

In this embodiment, the pivot position of the operation unit 700 is detected, and a determination is made as to whether or not the function corresponding to the detected pivot position is a function accompanying image formation. In the case of the function accompanying image formation, the preparatory operation for image formation is performed. On the other hand, if the pivot position of the operation unit 700 cannot be detected by the sensors 710, 711, the display section 701 is caused to extinguish. As a result, an operation input to the operation unit 700 is prohibited at a pivot position of the operation unit 700 other than predetermined pivot positions (for example, pivot positions facing the front and rear of the image forming apparatus), whereby an operator's erroneous input can be prevented.

In this embodiment, as erroneous input preventing means, control of extinguishing the display on the display section 701 of the operation unit 700 has been described. A similar effect can be attained by software by invalidating a key-operation input while the operation unit 700 is being pivoted.

Fifth Embodiment

An image forming apparatus according to a fifth embodiment is similar in construction to the image forming apparatuses according to the second to fourth embodiments. Like parts are denoted by like reference numerals, and descriptions thereof will be omitted.

In the above described fourth embodiment, the control to inhibit the operation input is carried out by extinguishing the display on the operation unit 700 if the pivot position of the operation unit 700 cannot be determined. In the fifth embodiment, a pivotal motion of the operation unit 700 is detected during execution of the preparatory operation for image formation, and the preparatory operation being in execution is interrupted, if the function selected upon the initial screen being displayed based on the detected pivot position does not require the preparatory operation for image formation.

Figure 15:
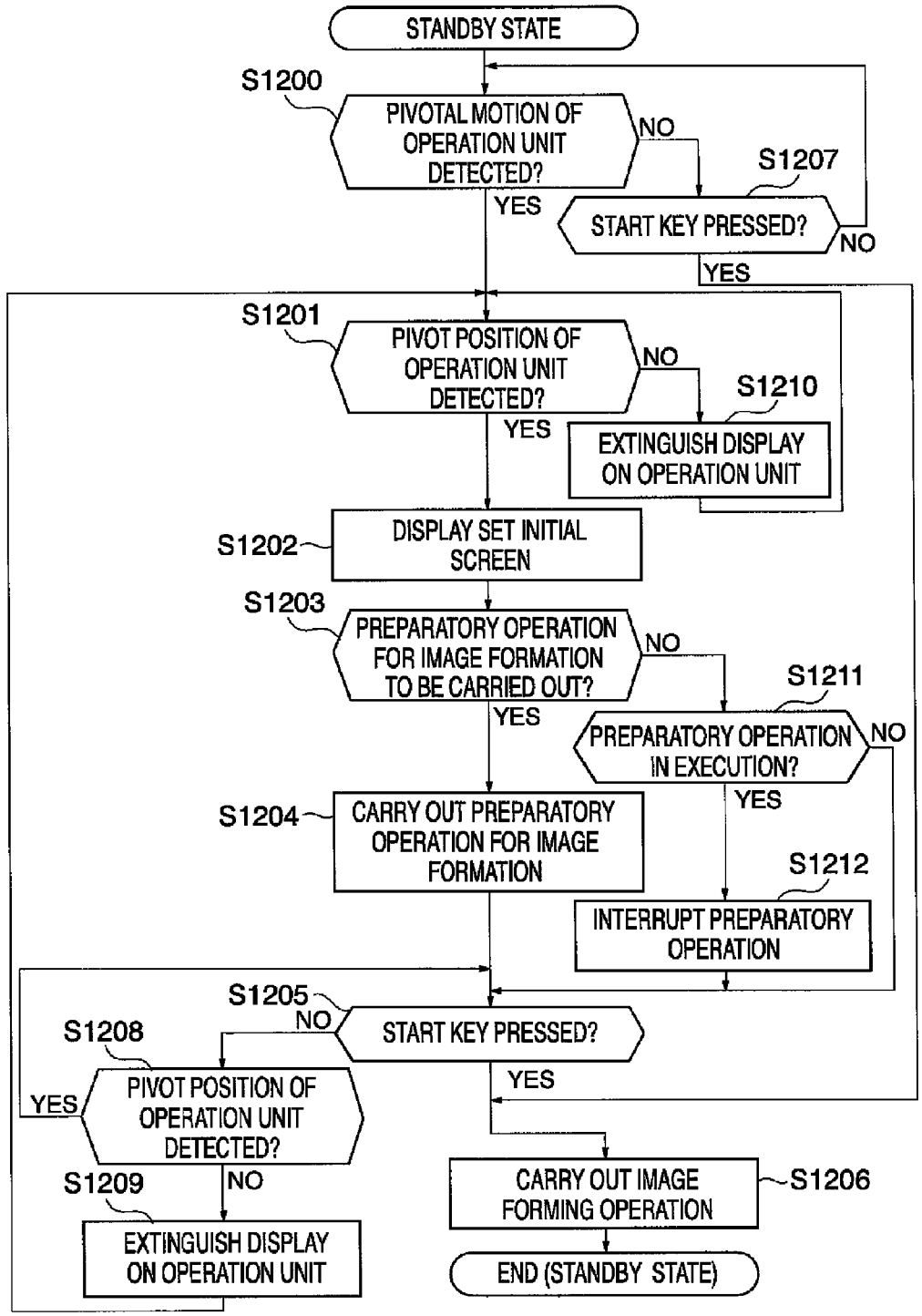
FIG. 15 is a flowchart schematically showing a control process carried out by an image forming apparatus according to a fifth embodiment of this invention.

FIG. 15 schematically shows in flowchart the control processing carried out by the image forming apparatus according to the fifth embodiment. The control processing is realized by the CPU 171 by reading out and performing a control program stored in the ROM 174.

The present embodiment is the same as the third embodiment in that a pivotal motion of the operation unit 700 is detected, the display on the operation unit 700 is changed over, and the liquid crystal display section 701 with touch panel is extinguished if the pivot position of the operation unit 700 is not detected. Therefore, explanations on the pivotal motion detection, the display changeover, and the extinction of the display section will be omitted.

Referring to FIG. 15, steps S1200 to S1203 corresponding to steps S1100 to S1103 of FIG. 14 and step S1210 corresponding to step S1110 of FIG. 14 are performed by the CPU 171.

If it is determined in step S1203 that the function selected according to the pivot position is the transmission/fax function, the CPU 171 determines whether or not the preparatory operation for image formation is in execution (step S1211). If it is determined that the preparatory operation for image formation is in execution, the CPU 171 interrupts the execution of the preparatory operation for image formation (step S1212), and then performs the processing in step S1205 and the subsequent steps. Steps S1205 to S1209 correspond to steps S1105 to S1109 in FIG. 14.

As described above, the pivot position of the operation unit 700 is detected, and whether or not the function corresponding to the detected pivot position requires the preparatory operation for image formation is determined. If it is determined that the function does not require the preparatory operation for image formation and the preparatory operation for image formation is in execution, such a wasteful preparatory operation for image formation is immediately interrupted. Since the wasteful preparatory operation for image formation which is unnecessary to be performed is not carried out, a reduction in service life of the image forming apparatus can be prevented.

In the first to fifth embodiments, the positions of the operation unit 700 facing the front and rear of the image forming apparatus are described by way of example as the pivot positions to be detected by the sensors 710, 711. However, this is not limitative. For example, the pivot positions to be detected may be ones facing the right side and left side of the apparatus. The number of pivot positions of the operation unit 700 to be detected is not limited to two and may be three or more. Also in that case, similar effects can be achieved by the above described method.

In the first to fifth embodiments, the construction has been described in which the operation unit 700 is disposed on an L-shaped arm extending from a side surface of the color reader unit 1 and made pivotable around the pivot axis A in substantially the horizontal direction of the image forming apparatus. However, the arrangement of the supporting part that supports the operation unit 700 is not limited thereto. For example, the operation unit 700 may be disposed on a supporting part extending toward upward of the automatic document feeder 102 such as to be pivotable around the supporting part. With such a construction, effects similar to those attained by the construction of the above described embodiments can be achieved. Alternatively, a turntable disposed on an upper surface of the color reader unit 1 or the color printer unit 2 of the image forming apparatus can be used as the supporting part, and the operation unit 700 can be supported by the supporting part (turntable).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-165476 and 2007-165477 filed Jun. 22, 2007 which are hereby incorporated by reference herein in their entirety.

What is claimed is:

1. An image forming apparatus comprising:
an image forming unit configured to perform image formation;
an operation panel configured to be pivotable relative to said image forming unit, said operation panel being configured to display information related to the image formation and configured for input of an instruction related to the image formation;
a pivot position detecting unit configured to detect a pivot position of said operation panel;
a registration unit configured to register, according to the input instruction, default setting screens to be displayed on said operation panel for input of the instruction, the default setting screens being registered to correspond to each of at least two pivot positions of said operation panel; and
a control unit configured to cause said operation panel to display a setting screen corresponding to the pivot position of said operation panel detected by said pivot position detecting unit among the at least two setting screens registered by said registration unit;
wherein said registration unit is capable of registering arbitrary processing modes for each of the at least two pivot positions of said operation panel as processing modes to be displayed on the default setting screens, the arbitrary processing modes being selected from among processing modes settable in the image forming apparatus.

2. The image forming apparatus according to claim 1, wherein in a case where it is detected by said pivot position detecting unit that said operation panel is pivoted from one to another of the at least two pivot positions, said control unit changes a setting screen displayed on said operation panel before said operation panel is pivoted to said another of the pivot positions over to a setting screen corresponding to said another of the pivot positions.

3. The image forming apparatus according to claim 1, wherein in a case where a pivot position of said operation panel cannot be detected by said pivot position detecting unit, said control unit causes said operation panel to extinguish the setting screen.

4. The image forming apparatus according to claim 1, wherein in a case where a pivot position of said operation panel cannot be detected by said pivot position detecting unit, said control unit inhibits inputting of a processing mode from said operation panel.

5. A control method for an image forming apparatus having an image forming unit configured to perform image formation and an operation panel configured to be pivotable, the operation panel being configured to display information related to the image formation and configured for input of an instruction related to the image formation, comprising:
registering, according to the input instruction, default setting screens to be displayed on the operation panel, the default setting screens being registered to correspond to each of at least two pivot positions of the operation panel;
detecting a pivot position of the operation panel;
causing the operation panel to display a setting screen corresponding to the detected pivot position of the operation panel among the registered setting screens; and
wherein said registering step includes registering arbitrary processing modes for each of the at least two pivot positions of said operation panel as processing modes to be displayed on the default setting screens, the arbitrary processing modes being selected from among processing modes settable in the image forming apparatus.

6. An image forming apparatus comprising:
an image forming unit configured to perform image formation;
an operation panel configured to be pivotable relative to the image forming unit, said operation panel being configured to display information related to the image formation and configured for input of an instruction related to the image formation;
a pivot position detecting unit configured to detect a pivot position of said operation panel;
a registration unit configured to register, according to the input instruction, default setting screens to be displayed on said operation panel for input of the instruction, the default setting screens being registered to correspond to each of at least two pivot positions of said operation panel;

a screen control unit configured to cause said operation panel to display the registered default setting screen corresponding to the pivot position detected by said pivot position detecting unit among at least two setting screens registered by said registration unit; and a preparation control unit configured to cause said image forming unit to start preparatory operation for the image formation, wherein the screen control unit causes, in a case where said pivot position detecting unit detects that said operation panel is pivoted to one of the at least two pivot positions, said operation panel to display the registered default setting screen corresponding to the one of the at least two pivot positions, wherein the preparation control unit causes, in a case where said operation panel displays a default setting screen which is required to be subjected to the preparatory operation for the image formation, said image forming unit to start the preparatory operation for the image formation; and wherein said registration unit is capable of registering arbitrary processing modes for each of the at least two pivot positions of said operation panel as processing modes to be displayed on the default setting screens, the arbitrary processing modes being selected from among processing modes settable in the image forming apparatus.

7. The image forming apparatus according to claim 6, wherein in a state where the pivot position cannot be detected by said pivotal position detecting unit, said control unit causes said operation panel to extinguish display.

8. The image forming apparatus according to claim 6, wherein the preparatory operation is interrupted by said control unit in a case where it is detected by said pivotal position detecting unit that the pivot position of said operation panel is changed after start of the preparatory operation, and a function corresponding to a pivot position changed is a function not accompanying the image formation.

9. The image forming apparatus according to claim 6, wherein said image forming unit includes an exposure unit configured to expose an image carrier by causing image information-based laser light to be reflected by a polyangular mirror and by rotating the polyangular mirror by a motor, a developing unit configured to develop electrostatic latent images formed on the plurality of image carriers to form toner images of respective colors, a transfer unit configured to transfer the toner images of respective colors onto a recording sheet conveyed at a predetermined speed, and a fixing unit configured to fix the toner images transferred onto the recording sheet, and wherein said image forming unit starts at least one of a driving of the motor and a heating of the fixing unit as the preparatory operation.

10. A control method for an image forming apparatus having an image forming unit configured to perform image formation and an operation panel configured to be pivotable, the operation panel being configured to display information related to an image formation and configured for input of an instruction related to the image formation, comprising:

detecting a pivot position of said operation panel;

registering, according to the input instruction, default setting screens to be displayed on said operation panel for input of the instruction, the default setting screens being registered to correspond to each of at least two pivot positions of said operation panel;

causing said operation panel to display the registered default setting screen corresponding to the detected pivot position among at least two registered setting screens; and causing said image forming unit to start preparatory operation for the image formation, wherein, in a case where said detecting step detects that said operation panel is pivoted to one of the at least two pivot positions, said operation panel is caused to display the registered default setting screen corresponding to the one of the at least two pivot positions, and wherein, in a case where said operation panel displays a default setting screen which is required to be subjected to the preparatory operation for the image formation, said image forming unit is caused to start the preparatory operation for the image formation; and wherein said registering step includes registering arbitrary processing modes for each of the at least two pivot positions of said operation panel as processing modes to be displayed on the default setting screens, the arbitrary processing modes being selected from among processing modes settable in the image forming apparatus.

11. The image forming apparatus of claim 1, wherein the processing modes include at least one of a copying function and a facsimile function.

* * * * *